(12) United States Patent
Higashitaniguchi et al.

(10) Patent No.: US 7,633,889 B2
(45) Date of Patent: Dec. 15, 2009

(54) CARRIER NETWORK OF VIRTUAL NETWORK SYSTEM AND COMMUNICATION NODE OF CARRIER NETWORK

(75) Inventors: Atsuko Higashitaniguchi, Yokohama (JP); Hiroshi Kinoshita, Yokohama (JP); Satsuki Norimatsu, Yokohama (JP); Masami Doukai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 873 days.

(21) Appl. No.: 11/060,717

(22) Filed: Feb. 17, 2005

(65) Prior Publication Data

US 2005/0163102 A1 Jul. 28, 2005

Related U.S. Application Data

(63) Continuation of application No. PCT/JP03/00461, filed on Jan. 21, 2003.

(51) Int. Cl.
*H04L 12/28* (2006.01)
*H04L 12/56* (2006.01)
*G06F 15/173* (2006.01)
*G06F 15/177* (2006.01)
*G06F 15/16* (2006.01)

(52) U.S. Cl. .................. 370/256; 370/389; 709/238; 709/221; 709/252

(58) Field of Classification Search .................. None
See application file for complete search history.

(56) References Cited

U.S. PATENT DOCUMENTS

| | | | |
|---|---|---|---|
| 6,775,283 B1* | 8/2004 | Williams | 370/392 |
| 7,130,303 B2* | 10/2006 | Hadzic | 370/389 |
| 2001/0025318 A1 | 9/2001 | Higashiyama | |
| 2003/0169694 A1* | 9/2003 | Seaman | 370/254 |
| 2003/0174715 A1* | 9/2003 | Yazaki | 370/397 |
| 2003/0225908 A1* | 12/2003 | Srinivasan et al. | 709/243 |

(Continued)

FOREIGN PATENT DOCUMENTS

EP 1 045 553 10/2000

(Continued)

OTHER PUBLICATIONS

International Search Report dated Apr. 15, 2003.

*Primary Examiner*—Pankaj Kumar
*Assistant Examiner*—Hicham B Foud
(74) *Attorney, Agent, or Firm*—Fujitsu Patent Center

(57) ABSTRACT

The present invention provides a carrier network in which a spanning tree with no loops can be constructed even in a dual homing configuration, and a communication method for a control frame. By allocating an identical virtual network identifier to a plurality of user networks connected to the carrier network, a single virtual network is constituted. An ingress communication node connected to a first user network of the plurality of user networks attaches a tag including the virtual network identifier to a control frame transmitted from the first user network, and transmits the control frame attached with the tag to a transmission destination determined on the basis of the virtual network identifier. An egress communication node connected to a second user network of the plurality of user networks receives the control frame attached with the tag, which is to be transmitted to the second user network, removes the tag from the control frame attached with the tag, and transmits the control frame to the second user network.

12 Claims, 21 Drawing Sheets

U.S. PATENT DOCUMENTS

2004/0042416 A1 * 3/2004 Ngo et al. .................. 370/254

FOREIGN PATENT DOCUMENTS

| JP | 2000-286853 | 10/2000 |
| JP | 2001-268104 | 9/2001 |
| JP | 2002-057713 | 2/2002 |
| JP | 2002-247089 | 8/2002 |

* cited by examiner

FIG. 7

USER NETWORK CONNECTION DETERMINING TABLE

| PORT NUMBER | USER NETWORK CONNECTION FLAG |
|---|---|
| 1 | 1 |
| 2 | 1 |
| 3 | 0 |
| ⋮ | ⋮ |

FIG. 8

VLAN-ID TABLE

| PORT NUMBER | VLAN-ID |
|---|---|
| 1 | 1 |
| 2 | 2 |
| ⋮ | ⋮ |

FIG. 9

VLAN FILTERING TABLE

| VLAN-ID | PORT TRANSFER FLAG | | |
|---|---|---|---|
|  | 1 | 2 | 3 |
| 0 | 1 | 1 | 1 |
| 1 | 1 | 0 | 1 |
| 2 | 0 | 1 | 1 |
| 3 | 0 | 0 | 0 |
| ⋮ | ⋮ | ⋮ | ⋮ |

FIG. 10

USER NETWORK CONNECTION DETERMINING TABLE

| PORT NUMBER | USER NETWORK CONNECTION FLAG |
|---|---|
| 1 | 0 |
| 2 | 0 |
| ⋮ | ⋮ |

FIG. 11

VLAN FILTERING TABLE

| VLAN-ID | PORT TRANSFER FLAG | |
|---|---|---|
| | 1 | 2 |
| 0 | 1 | 1 |
| 1 | 1 | 1 |
| 2 | 1 | 1 |
| 3 | 0 | 0 |
| ⋮ | ⋮ | ⋮ |

FIG. 12

USER NETWORK CONNECTION
DETERMINING TABLE

| PORT NUMBER | USER NETWORK CONNECTION FLAG |
|---|---|
| 1 | 0 |
| 2 | 1 |
| 3 | 1 |
| ⋮ | ⋮ |

FIG. 13

VLAN FILTERING TABLE

| VLAN-ID | PORT TRANFSER FLAG | | |
|---|---|---|---|
| | 1 | 2 | 3 |
| 0 | 1 | 1 | 1 |
| 1 | 1 | 1 | 0 |
| 2 | 1 | 0 | 1 |
| 3 | 0 | 0 | 0 |
| ⋮ | ⋮ | ⋮ | ⋮ |

FIG. 14

MAC ADDRESS FILTERING TABLE

| DESTINATION MAC ADDRESS | PORT TRANSFER FLAG | | |
|---|---|---|---|
| | 1 | 2 | 3 |
| ⋮ | ⋮ | ⋮ | ⋮ |
| 00-E0-00-00-11-01 | 1 | 0 | 0 |
| 00-E0-00-00-11-02 | 0 | 0 | 1 |
| 00-E0-00-00-11-11 | 1 | 0 | 0 |
| 00-E0-00-00-11-22 | 0 | 0 | 1 |
| 00-E0-00-00-22-11 | 0 | 1 | 0 |
| 01-80-C2-00-00-00 | 1 | 1 | 1 |
| ⋮ | ⋮ | ⋮ | ⋮ |
| FF-FF-FF-FF-FF-FF | 1 | 1 | 1 |

FIG. 15

MAC ADDRESS FILTERING TABLE

| DESTINATION MAC ADDRESS | PORT TRANSFER FLAG | | |
|---|---|---|---|
| | 1 | 2 | 3 |
| ⋮ | ⋮ | ⋮ | ⋮ |
| 00-E0-00-00-11-01 | 1 | 0 | 0 |
| 00-E0-00-00-11-02 | 0 | 1 | 0 |
| 00-E0-00-00-11-11 | 1 | 0 | 0 |
| 00-E0-00-00-11-22 | 0 | 1 | 0 |
| 00-E0-00-00-22-11 | 1 | 0 | 0 |
| 01-80-C2-00-00-00 | 1 | 1 | 1 |
| ⋮ | ⋮ | ⋮ | ⋮ |
| FF-FF-FF-FF-FF-FF | 1 | 1 | 1 |

BPDU FRAME

VLAN TAG-STACKED BPDU FRAME

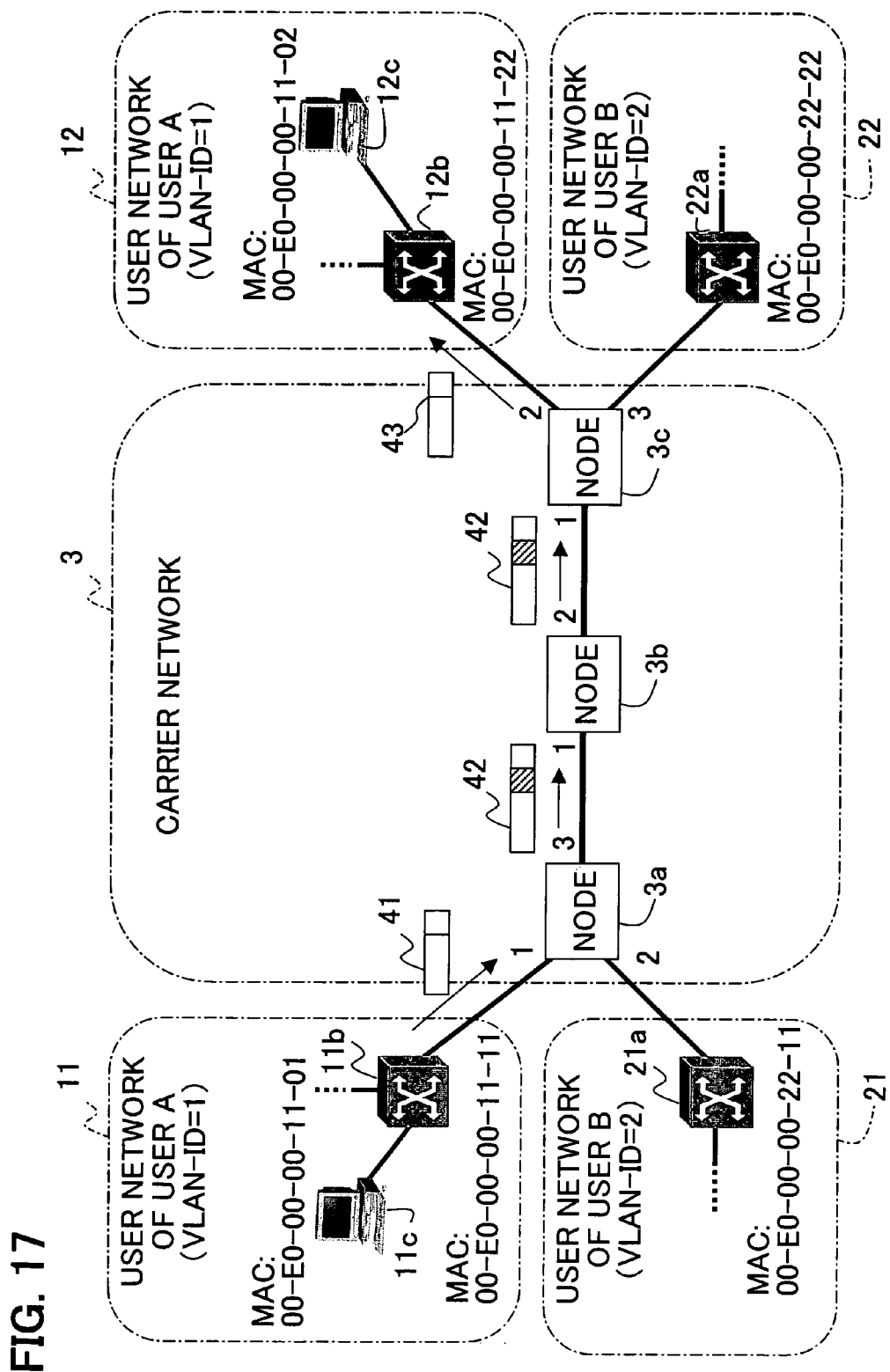

BPDU FRAME

VLAN TAG STACKED BPDU FRAME

DATA FRAME

VLAN TAG STACKED DATA FRAME

CARRIER NETWORK OF VIRTUAL NETWORK SYSTEM AND COMMUNICATION NODE OF CARRIER NETWORK

CROSS-REFERENCE TO RELATED APPLICATION

This application is a continuation of International Application Number PCT/JP2003/000461 which was filed on Jan. 21, 2003, the contents of which are herein wholly incorporated by reference.

TECHNICAL FIELD

The present invention relates to a carrier network in a virtual network system and a communication method for a control frame, and more particularly to a carrier network in a virtual network system in which a plurality of user networks connected to a carrier network is constituted as a single virtual network by allocating the same virtual network identifier to the plurality of user networks, and a communication method for a control frame.

The present invention also relates to a communication node of the carrier network in the virtual network system.

BACKGROUND ART

Typically, when a business enterprise or the like constructs a private network, a method of construction using a private line, a method of construction by means of an IP-VPN (Virtual Private Network) using IP (Internet Protocol), or a method of construction by means of a wide range LAN service using a VLAN (Virtual LAN) is employed. Among these methods, construction methods using a wide range LAN service are becoming more widespread due to the low cost and easy management of a wide range LAN service in comparison with a private line or IP-VPN.

Among wide range LAN services, VLAN over VLAN technology, which allows a user to perform VLAN allocation freely with no restrictions from the carrier, is gaining attention.

In VLAN over VLAN technology, a VLAN frame received from a user is transferred over the carrier network transparently, and hence the ingress node of the carrier network only attaches (stacks) VLAN information (a VLAN tag) which is valid within the carrier network to a frame received from a user network. Each node in the carrier network transfers the frame using the VLAN tag and a destination MAC address. The egress node of the carrier network deletes the VLAN tag stacked onto the frame and transfers the frame to the user network. In so doing, the user network is provided with free VLAN allocation.

Meanwhile, to prevent the same frame from being transferred repeatedly between nodes in a loop form, the nodes providing the wide range LAN service construct a network having a tree structure with no loops using a spanning tree protocol (STP) conforming to IEEE802.1D.

In STP, the lower bridge of the tree structure uses the information of a BPDU (Bridge Protocol Data Unit), which is a control frame received from the upper bridge, to recalculate the spanning tree. The BPDU is not stacked with a VLAN tag, and therefore a BPDU transmitted from the user network (LAN or the like) of a user A may also be transmitted to the user network of another user B. For example, in FIG. 27, a BPDU transmitted from a user network 501 of a user A may be transmitted not only to a user network 502 of the same user A, but also to a user network 601 and/or a user network 602 of another user B.

Moreover, when bridges are added to and deleted from user networks such that the configuration of the user network changes, or when the root bridge (a bridge 510 in FIG. 27, for example) is damaged, the next root bridge may become a node of the carrier network or a bridge on the user network of the user B. Such changes in the configuration of the network of a certain user may affect the user network of another user.

To solve this problem, a method of constructing spanning trees independently in a user network and a carrier network has been considered. In FIG. 27, for example, a spanning tree is constructed between the respective user networks 501, 502 of the user A, a spanning tree is constructed between the respective user networks 601, 602 of the user B, and a spanning tree is constructed for a carrier network 700.

In this method, a spanning tree is constructed by discarding a BPDU entering the carrier network from the user network at an ingress node 701.

As shown in FIG. 28, however, with this method, when a dual homing configuration connecting a plurality of lines is constructed between the user network and carrier network as a damage prevention measure, the STP becomes incomplete between the user networks spanning the carrier network such that the occurrence of loops is not detected. As a result, transfer frames are caught in an infinite loop.

To solve this problem, a method may be employed in which an STP is not used during user network construction, and instead a maintenance person performs setting manually in consideration of the topology, ensuring that no loops occur in the user network. With this method, however, the configuration of the networks spanning the carrier must be taken into consideration, and transfer routes must be set for all of the MAC addresses used in the user networks, which is unrealistic.

Hence when a dual homing configuration is constructed, a network without loops is provided by disposing a router on the edge side of the user network.

With this method, however, the use of a router causes an increase in the network construction cost. Moreover, this method cannot be called a wide range LAN service, which provides a VLAN using a reasonably-priced network device such as a bridge, and hence in essence, a wide range LAN service cannot be provided.

Meanwhile, in optical networks and the like, a "Method for routing traffic between network components to protect network against fault", disclosed in Japanese Unexamined Patent Application Publication 2002-57713, has been proposed as a dual home approach providing protection against network faults.

DISCLOSURE OF THE INVENTION

The present invention provides a carrier network in which a spanning tree with no loops can be constructed even in a dual homing configuration, a communication method for a control frame, and a communication node of the carrier network.

A carrier network according to a first aspect of the present invention is a carrier network in a virtual network system in which a plurality of user networks connected to the carrier network is constituted as a single virtual network by allocating an identical virtual network identifier to the plurality of user networks, comprising an ingress communication node connected to at least a first user network of the plurality of user networks in order to receive a control frame transmitted from the first user network, which attaches a tag including the virtual network identifier to the received control frame, and transmits the control frame attached with the tag to a transmission destination determined on the basis of the virtual network identifier, and an egress communication node connected to at least a second user network of the plurality of user networks, which receives the control frame attached with the tag, which is to be transmitted to the second user network, removes the tag from the control frame attached with the tag, and transmits the control frame to the second user network.

A communication method for a control frame according to the first aspect of the present invention is a communication method for a control frame of a carrier network in a virtual network system in which a plurality of user networks connected to the carrier network is constituted as a single virtual network by allocating an identical virtual network identifier to the plurality of user networks, comprising the following steps: in an ingress communication node connected to at least a first user network of the plurality of user networks, a tag including the virtual network identifier is attached to a control frame received from the first user network, and the control frame attached with the tag is transmitted to a transmission destination determined on the basis of the virtual network identifier; and in an egress communication node connected to at least a second user network of the plurality of user networks, the control frame attached with the tag, which is to be transmitted to the second user network, is received, the tag is removed from the control frame attached with the tag, and the control frame is transmitted to the second user network.

According to the first aspect of the present invention, the tag including the virtual network identifier is attached to a control frame transmitted to the carrier network from the first user network in the ingress communication node of the carrier network. The control frame attached with the tag is transferred through the carrier network to the egress communication node, where the tag is removed and the control frame is transmitted to the second user network. Hence a control frame from the user network of a certain user is transferred to a user network of the same user in accordance with the tag including the virtual network identifier. As a result, situations in which a control frame of a certain user is delivered to the user network of another user are prevented.

Further, the control frame is not discarded at the ingress communication node, but transmitted through the carrier network and transferred to the user network. Hence the carrier network is handled as a single link on the user network spanning tree, and therefore the user network spanning tree can be constructed in consideration of the carrier network (single link). As a result, a spanning tree with no loops can be constructed even in a dual homing configuration.

In the first aspect of the present invention, the carrier network further comprises a relay communication node which receives the control frame attached with the tag, transmitted from the ingress communication node, and transfers the control frame to a transfer destination determined on the basis of the virtual network identifier included in the tag of the received control frame. Thus control frames are transferred similarly to data frames by the relay communication node in the carrier network.

According to another embodiment of the first aspect of the present invention, the ingress communication node copies header information of the control frame, modifies a destination address included in the copied header information from a destination address for the control frame to a destination address for broadcasting, and further attaches [the copied header information including the modified destination address] to the control frame as a new header. The egress communication node further removes the attached new header from the control frame.

As a result, the control frame can be processed similarly to a data frame in the relay communication node of the carrier network.

The control frame is preferably a BPDU in a spanning tree protocol. The ingress communication node further receives the BPDU, transmitted from a communication node within the carrier network, and executes processing to construct a spanning tree of the carrier network on the basis of the received BPDU. The egress communication node further receives the BPDU, to which the tag including the virtual identifier is not attached, and executes processing to construct the spanning tree of the carrier network on the basis of the received BPDU.

As a result, the carrier network spanning tree can be constructed individually, independently of the user networks, so that a spanning tree with no loops can be constructed in the carrier network as well.

A communication node according to a second aspect of the present invention is a communication node of a carrier network in a virtual network system in which a plurality of user networks connected to the carrier network is constituted as a single virtual network by allocating an identical virtual network identifier to the plurality of user networks, comprising a reception portion connected to at least one of the plurality of user networks, for receiving a control frame transmitted from this at least one user network, a tag attaching portion for attaching a tag including the virtual network identifier to the control frame received by the reception portion, and a transmission portion for transmitting the control frame, attached with the tag by the tag attaching portion, to a transmission destination determined on the basis of the virtual network identifier.

A communication node according to a third aspect of the present invention is a communication node of a carrier network in a virtual network system in which a plurality of user networks connected to the carrier network is constituted as a single virtual network by allocating an identical virtual network identifier to the plurality of user networks, comprising a reception portion for receiving a control frame to which a tag including the virtual network identifier is attached, a tag deleting portion for deleting the tag from the control frame when a transmission destination determined on the basis of the virtual network identifier included in the tag of the control frame received by the reception portion is one of the plurality of user networks, and a transmission portion for transmitting the control frame, from which the tag has been deleted by the tag deleting portion, to one of the plurality of user networks.

A communication node according to a fourth aspect of the present invention is a communication node of a carrier network in a virtual network system in which a plurality of user networks connected to the carrier network is constituted as a single virtual network by allocating an identical virtual network identifier to the plurality of user networks, comprising a reception portion for receiving a control frame to which a tag including the virtual network identifier is attached, transmitted from another communication node within the carrier network, a transmission destination determining portion for determining a transmission destination communication node on the basis of the virtual network identifier included in the tag of the control frame received by the reception portion, and a transmission portion for transmitting the control frame to the transmission destination communication node determined by the transmission destination determining portion.

A communication node according to a fifth aspect of the present invention is a communication node of a carrier network in a virtual network system in which a plurality of user networks connected to the carrier network is constituted as a single virtual network by allocating an identical virtual network identifier to the plurality of user networks, comprising a reception portion for receiving a control frame transmitted from another communication node within the carrier network and attached with a tag including the virtual network identifier and a new header in which a destination address included in a copy of original header information has been modified to a destination address for broadcasting, and for receiving a data frame attached with the tag and the new header constituted by a copy of the original header information, a transmission destination determining portion for determining a transmission destination communication node on the basis of the virtual network identifier included in the tag of the control frame and data frame received by the reception portion, and a transmission portion for transmitting the control frame and data frame to the transmission destination communication node determined by the transmission destination determining portion.

BRIEF DESCRIPTION OF THE DRAWINGS

FIG. 7 shows a user network connection determining table of a node 3a;

FIG. 8 shows a VLAN-ID table of the node 3a;

FIG. 9 shows a VLAN filtering table of the node 3a;

FIG. 10 shows a user network connection determining table of a node 3b;

FIG. 11 shows a VLAN filtering table of the node 3b;

FIG. 12 shows a user network connection determining table of a node 3c;

FIG. 13 shows a VLAN filtering table of the node 3c;

FIG. 14 shows a MAC address filtering table of the node 3a;

FIG. 15 shows a MAC address filtering table of the node 3b;

FIG. 17 shows a condition in which a BPDU is transmitted on the wide range LAN shown in FIG. 1;

BEST MODES FOR CARRYING OUT THE INVENTION

First Embodiment

[Overall Configuration of Wide Range LAN]

Figure 1:
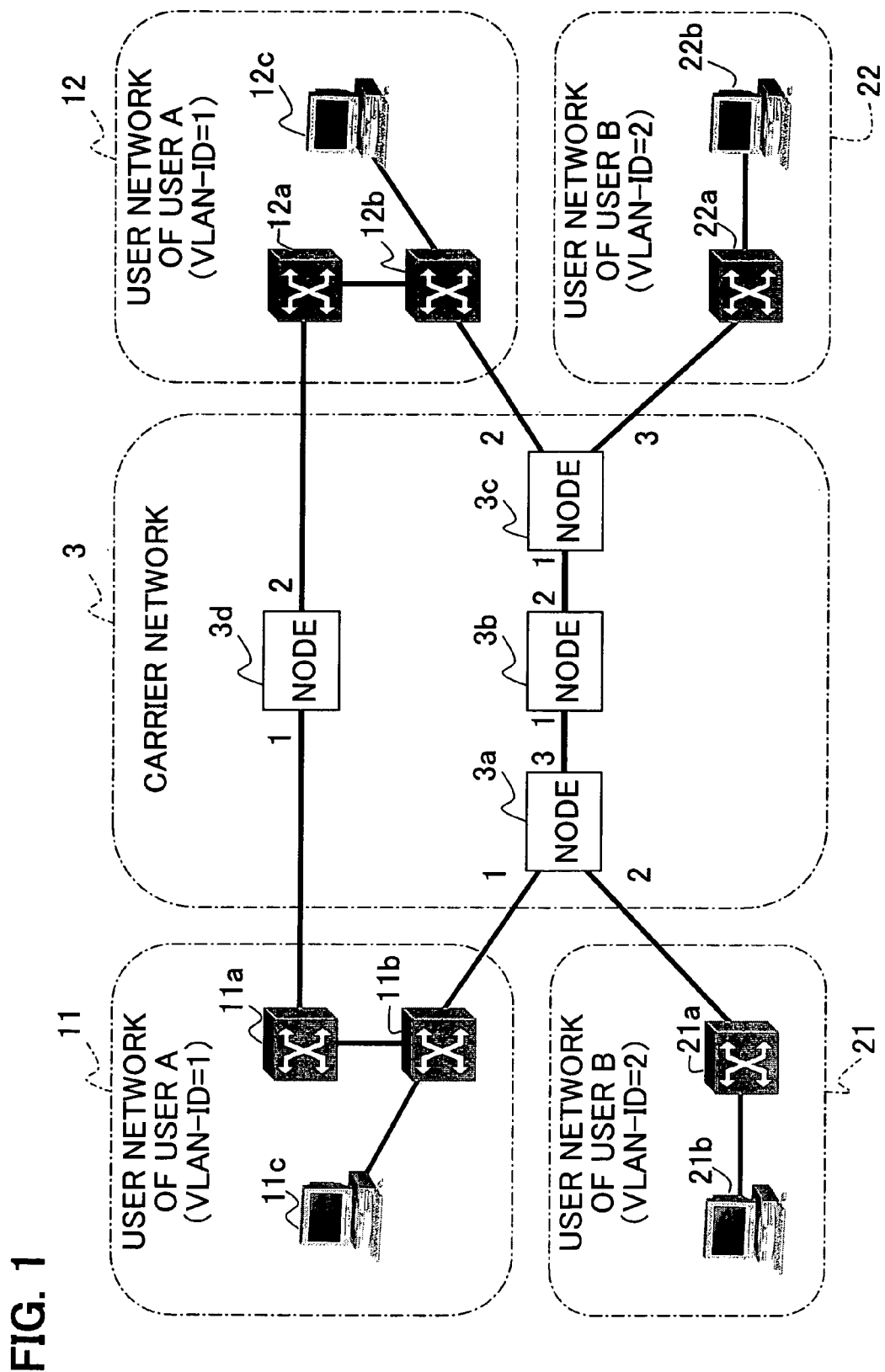
FIG. 1 is a block diagram showing an example of a network configuration of a wide range LAN to which the present invention is applied.

FIG. 1 is a block diagram showing an example of the network configuration of a wide range LAN to which the present invention is applied. This wide range LAN comprises user networks (LANs) 11 and 12 of a user (a business enterprise, for example) A, user networks 21 and 22 of a user B, and a carrier network 3.

The user network 11 is a LAN provided in a building a1 (not shown) such as the building or factory of the user A, for example, and comprises bridges 11a and 11b, and a terminal (a personal computer or the like) 11c. The user network 12 is a LAN provided in a different building a2 (not shown) of the user A to the aforementioned building a1, for example, and comprises bridges 12a and 12b, and a personal computer 12c.

The user network 21 is a LAN provided in a building b1 (not shown) of the user B, for example, and comprises a bridge 21a and a personal computer 21b. The user network 22 is a LAN provided in a different building b2 (not shown) to the building b1, for example, and comprises a bridge 22a and a personal computer 22b.

The carrier network 3 connects the LANs of the user A, in other words the user networks 11 and 12, to form a wide range LAN, and connects the LANs of the user B, in other words the user networks 21 and 22, to form a wide range LAN. The carrier network 3 comprises nodes 3a to 3d such as routers. In the drawing, the reference symbols 1 to 3 in the vicinity of the nodes 3a to 3d denote the port numbers of each node.

In this wide range LAN, VLAN over VLAN technology is used to form a virtual LAN (VLAN) constituted by the user networks 11 and 12 of the user A and a VLAN constituted by the user networks 21 and 22 of the user B. It is assumed that a VLAN-ID=1 is allocated to the user networks 11 and 12, and a VLAN-ID=2 is allocated to the user networks 21 and 22. The VLAN-ID is an identifier identifying the VLAN, and takes a unique value on a layer 2 network in an OSI layer model.

Note that in FIG. 1, two VLANs are shown as an example, but one or three VLANs may be provided. In other words, in the present invention there are no limitations on the number of VLANs.

The node 3a is an ingress node to the carrier network 3 when seen from the user networks 11 and 21, and an egress node from the carrier network 3 when seen from the user networks 12 and 22. The node 3c is an egress node from the carrier network 3 when seen from the user networks 11 and 21, and an ingress node to the carrier network 3 when seen from the user networks 12 and 22. The node 3b is a relay node (intermediate node). The node 3d serves as an ingress node, an egress node, and a relay node of the carrier network 3 when seen from the user networks 11 and 12.

In the VLAN (wide range LAN), data frames and control frames are exchanged. A data frame is a frame comprising user data (for example, electronic mail data from the terminal 11c, downloaded data from a website, and so on). A control frame is a frame for exchanging network control information. Examples of control frames include a BPDU (Bridge Protocol Data Unit), a GVRP (GARP (Generic Attribute Registration Protocol) VLAN Registration Protocol), and a GMRP (GARP Multicast Registration Protocol).

As described in the background art section, a BPDU is a control frame transmitted in an STP to construct a spanning tree. Hereafter in this embodiment, a BPDU will be used as an example of a control frame. However, the present invention is not limited to a BPDU, and another control frame may be applied.

In the wide range LAN constituted in this manner, when a data frame is to be transferred from a user network to the carrier network, a VLAN tag including the VLAN-ID is stacked (attached) onto the data frame in accordance with settings at the ingress node of the carrier network. This point is similar to the background art described above.

For example, a VLAN tag is stacked onto a data frame transferred from the bridge 11b of the user network 11 to the carrier network 3 at the node 3a. The data frame stacked with the VLAN tag is then transferred through the carrier network 3 on the basis of a MAC address and the VLAN tag, and delivered to the target user network 12.

Conventionally, VLAN tags are not stacked onto control frames such as BPDUs. In this embodiment, however, a control frame to be transmitted from a user network to the carrier network is stacked with a VLAN tag at the ingress node of the carrier network, and then transferred through the carrier network. At the egress node of the carrier network, the VLAN tag is removed from the control frame, whereupon the control frame is transmitted to a user network.

For example, a VLAN tag is stacked onto a control frame transferred from the bridge 11b of the user network 11 to the carrier network 3 at the node 3a. The control frame stacked with the VLAN tag is then transferred through the carrier network 3 on the basis of the MAC address and the VLAN tag, and delivered to the target user network 12.

Thus in this embodiment, a VLAN tag is also stacked onto a BPDU, and hence in the carrier network 3, BPDUs transmitted from one user network 11 (12) of the user A are transferred only to the other user network 12 (11) of the same user A, and not transferred to the user networks 21 and 22 of the other user B. Likewise, BPDUs transmitted from one user network 21 (22) of the user B are transferred only to the other user network 22 (21) of the same user B, and not transferred to a user network of the user A.

Further, the BPDU is not discarded at the ingress node of the carrier network, but is transferred over the carrier network to reach the user network, and hence in the spanning tree, the carrier network is handled as a single link. As a result, spanning trees with no loops can be constructed as the spanning trees of the user networks.

Moreover, by transferring a BPDU that is not stacked with a VLAN tag through the carrier network, a spanning tree with no loops can also be constructed as the spanning tree of the carrier network.

The content of this embodiment will now be described in further detail.

[Node Constitution in Carrier Network]

Figure 2:
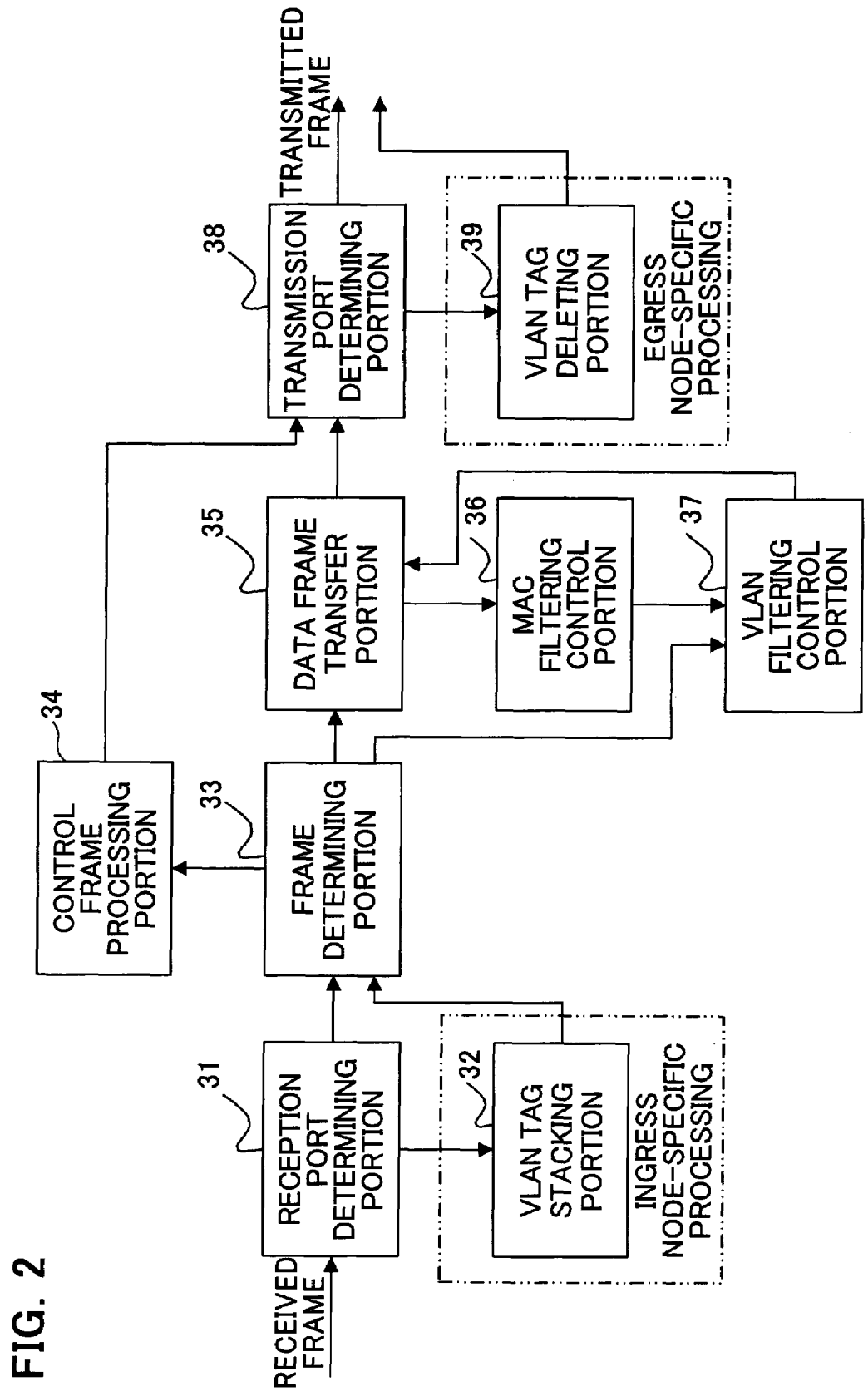
FIG. 2 is a block diagram showing in detail the constitution of a node in a carrier network according to a first embodiment of the present invention.
Figure 3:
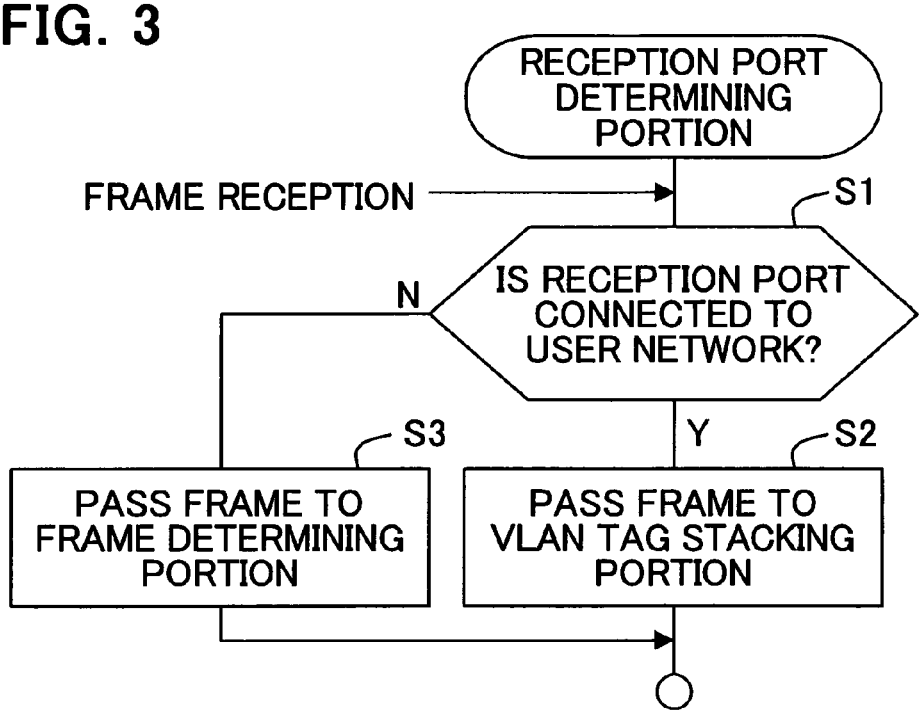
FIG. 3 is a flowchart showing a processing flow of a reception port determining portion of the node.
Figure 4:
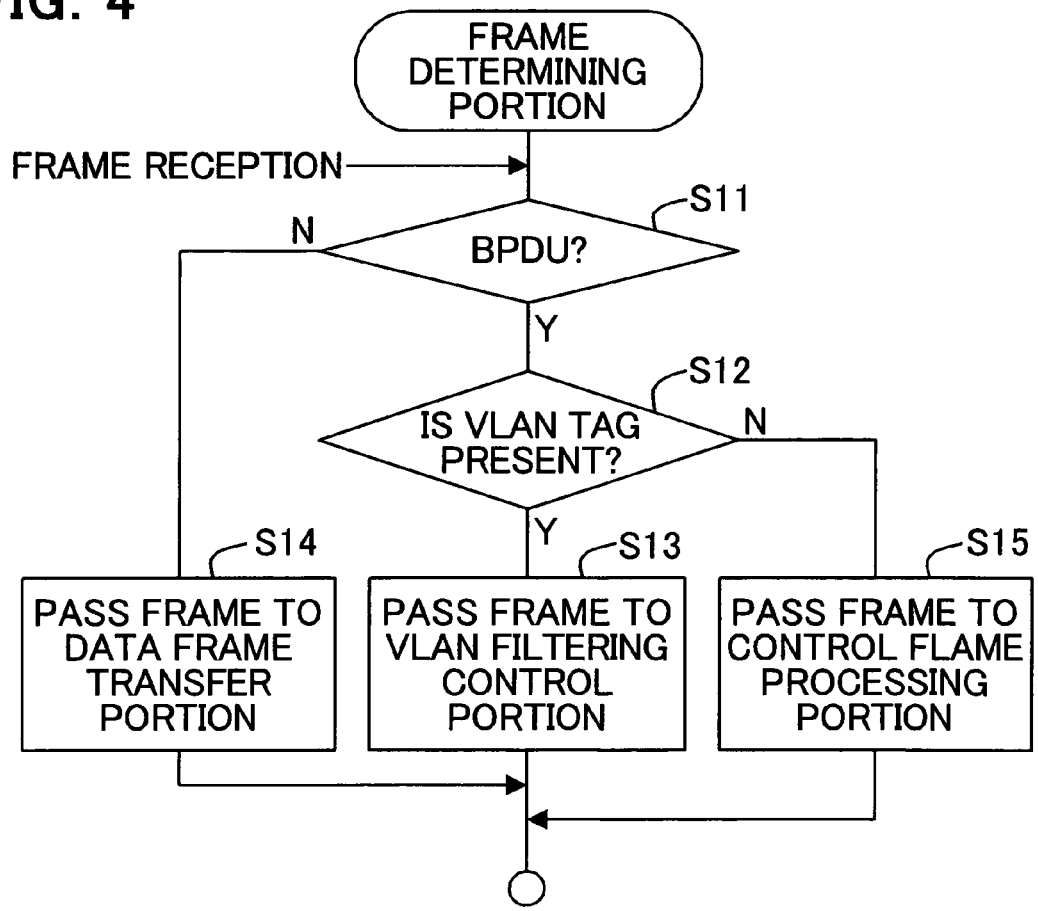
FIG. 4 is a flowchart showing a processing flow of a frame determining portion of the node.
Figure 5:
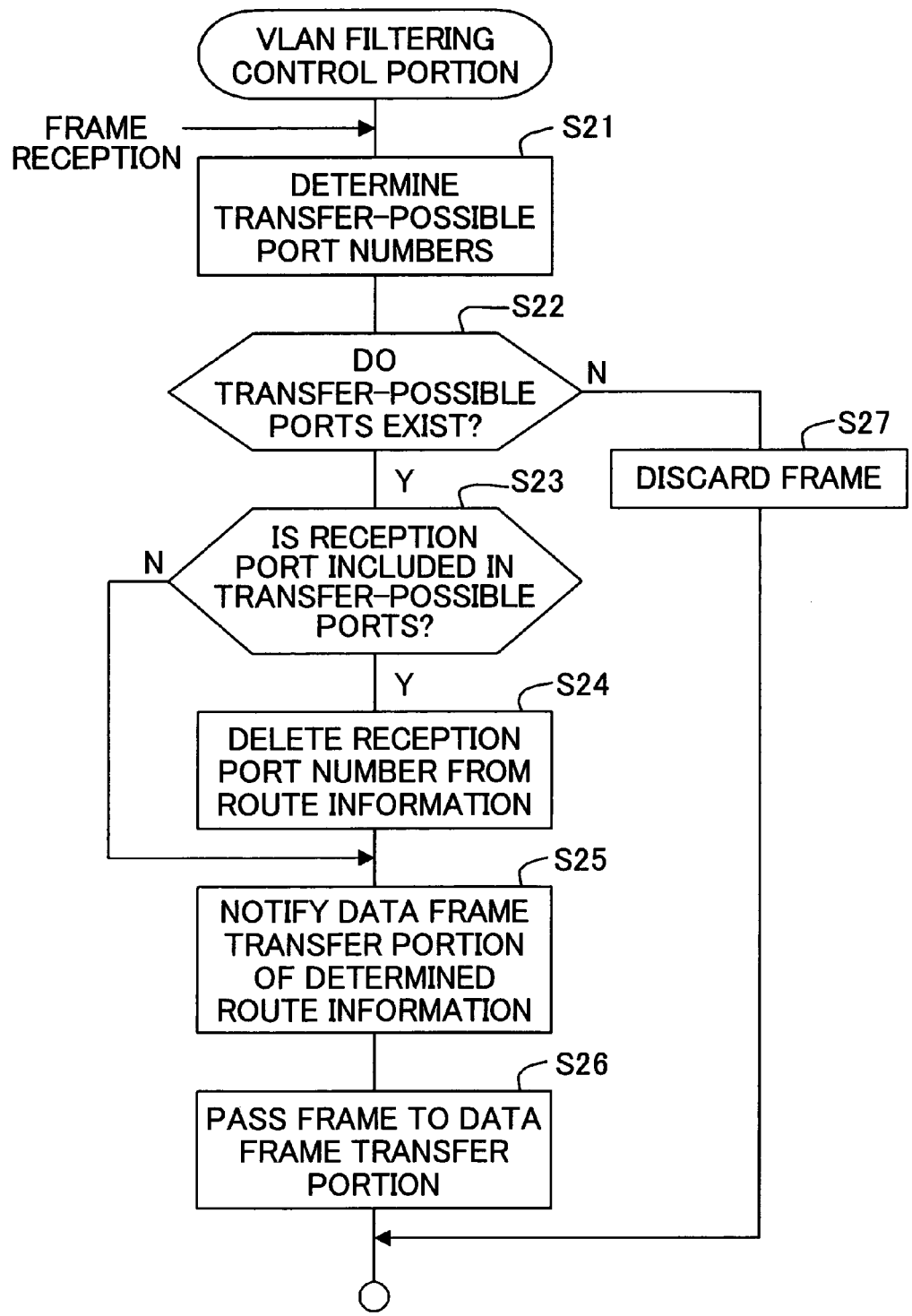
FIG. 5 is a flowchart showing a processing flow of a VLAN filtering control portion of the node.
Figure 6:
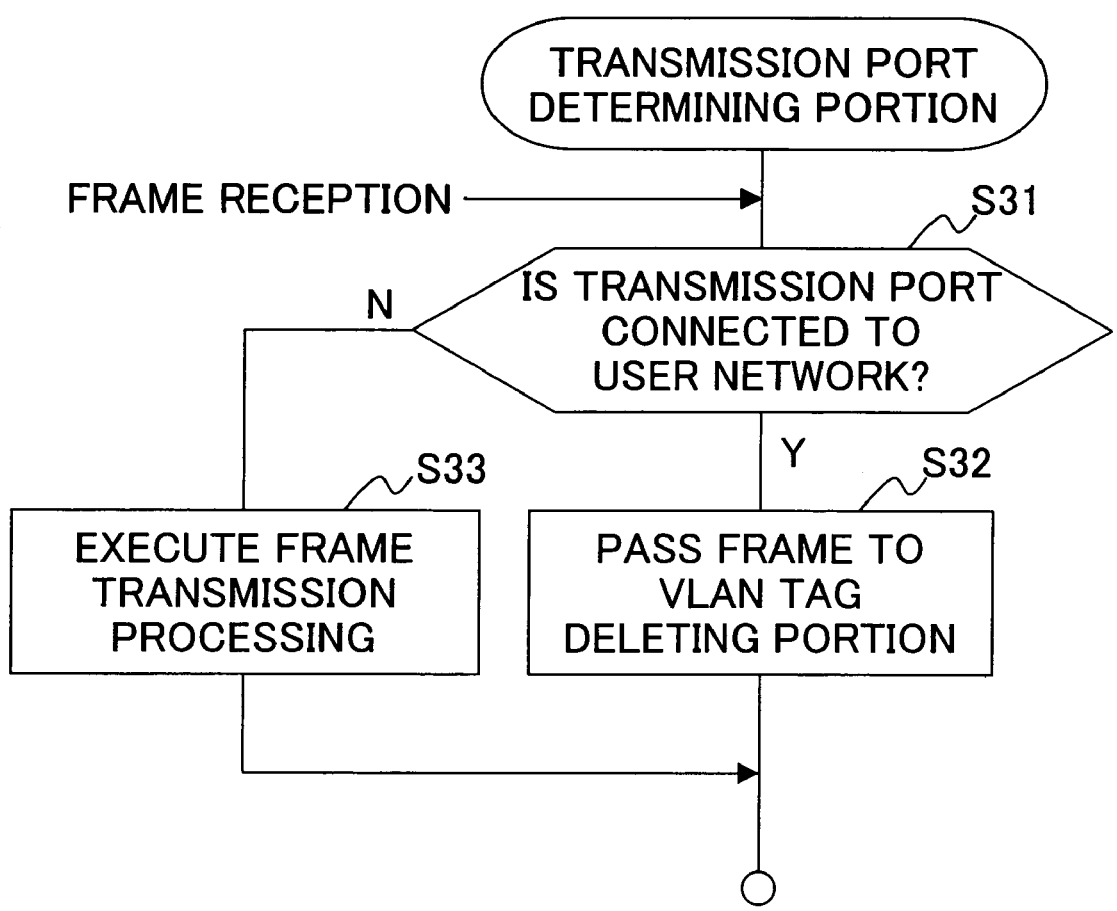
FIG. 6 is a flowchart showing a processing flow of a transmission port determining portion of the node.

FIG. 2 is a block diagram showing in detail the constitution of the nodes 3a to 3d in the carrier network 3 according to the first embodiment of the present invention. FIG. 3 is a flowchart showing a processing flow of a reception port determining portion of the node. FIG. 4 is a flowchart showing a processing flow of a frame determining portion of the node. FIG. 5 is a flowchart showing a processing flow of a VLAN filtering control portion of the node. FIG. 6 is a flowchart showing a processing flow of a transmission port determining portion of the node.

The nodes 3a to 3d have an identical constitution, and hence in the following, will be referred to in total as "the node", except in cases where the nodes 3a to 3d are specified in particular.

The node comprises a reception port determining portion 31, a VLAN tag stacking portion 32, a frame determining portion 33, a control frame processing portion 34, a data frame transfer portion 35, a MAC filtering control portion 36, a VLAN filtering control portion 37, a transmission port determining portion 38, and a VLAN tag deleting portion 39.

A frame received by the node is inputted into the reception port determining portion 31. The reception port determining portion 31 determines whether or not the port which receives the frame is a port connected to a user network on the basis of a preset network connection determining table (S1 in FIG. 3). When the reception port is connected to a user network (Y in S1 of FIG. 3), the reception port determining portion 31 passes the received frame to the VLAN tag stacking portion 32 (S2 in FIG. 3), and when the reception port is not connected to a user network (N in S1 of FIG. 3), the reception port determining portion 31 passes the received frame to the frame determining portion 33 (S3 in FIG. 3).

FIG. 7 shows the user network connection determining table of the node 3a. FIG. 10 shows the user network connection determining table of the node 3b. FIG. 12 shows the user network connection determining table of the node 3c.

The user network connection determining table comprises a port number, and a user network connection flag indicating whether or not the port corresponding to the port number is connected to a user network. When the connection flag is at one, the port of the corresponding port number is connected to a user network, and when the connection flag is at zero, the port of the corresponding port number is not connected to a user network.

FIG. 7 shows that ports having the port numbers 1 and 2 of the node 3a are connected to a user network, and a port having the port number 3 is not connected to a user network. More specifically, the port having the port number 1 is connected to the user network 11 (bridge 11b), the port having the port number 2 is connected to the user network 21 (bridge 21a), and the port having the port number 3 is connected to the node 3b of the carrier network (see FIG. 1).

FIG. 10 shows that ports having the port numbers 1 and 2 of the node 3b are not connected to a user network. More specifically, the port having the port number 1 is connected to the node 3a, and the port having the port number 2 is connected to the node 3c (see FIG. 1).

FIG. 12 shows that a port having port number 1 of the node 3c is not connected to a user network, but ports having the port numbers 2 and 3 are connected to a user network. More specifically, the port having the port number 1 is connected to the node 3b, the port having the port number 2 is connected to the user network 12 (bridge 12b), and the port having the port number 3 is connected to the user network 22 (bridge 22a) (see FIG. 1).

The reception port determining portion 31 determines whether or not the reception port is connected to a user network on the basis of the network connection flag (0/1).

Returning to FIG. 2, the VLAN tag stacking portion 32 stacks (attaches) a VLAN tag, including a VLAN-ID corresponding to the reception port, onto the received frame from the reception port determining portion 31. Having been stacked with a VLAN tag, the received frame is passed to the frame determining portion 33.

The processing of the VLAN tag stacking portion 32 is performed on frames received directly from a user network, and is therefore ingress node-specific processing.

The VLAN-ID is determined on the basis of a preset VLAN-ID table. FIG. 8 shows an example of the VLAN-ID table of the node 3a. The VLAN-ID table comprises a port number, and the VLAN-ID of the user network to which the port of the port number is connected. In FIG. 8, the user network 11 connected to the port number 1 of the node 3a has a VLAN-ID=1, and the user network 21 connected to the port number 2 of the node 3a has a VLAN-ID=2.

Figure 16A:
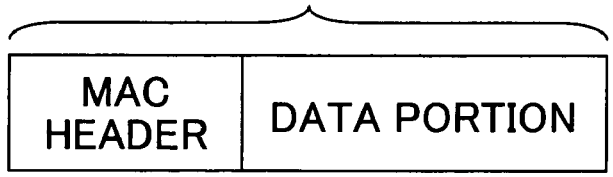
FIG. 16A shows a data structure of a BPDU onto which a VLAN tag is not stacked.
Figure 16B:
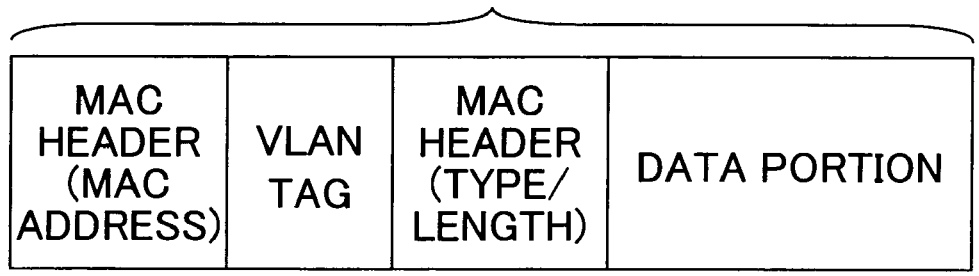
FIG. 16B shows a data structure of a BPDU onto which a VLAN tag is stacked.
Figure 16C:
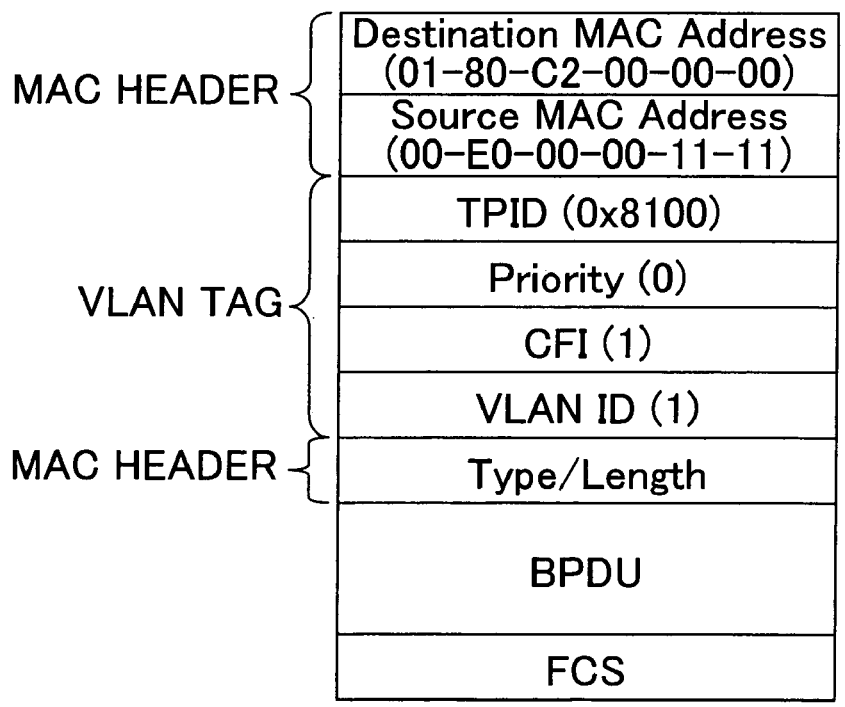
FIG. 16C shows a detailed data structure of a BPDU onto which a VLAN tag is stacked.

FIG. 16A shows the data structure of a BPDU onto which a VLAN tag is not stacked, FIG. 16B shows the data structure of a BPDU onto which a VLAN tag is stacked, and FIG. 16C shows the detailed data structure of a BPDU onto which a VLAN tag is stacked. The VLAN tag is stacked between the MAC address (destination address (Destination MAC Address) and source address (Source MAC Address)) and the type/length of the MAC header. The VLAN tag is constituted by four bytes of VLAN information comprising a TPID (0x8100), a CFI, and the VLAN-ID. Note that the destination MAC address of the BPDU is determined at 0x01-80-C2-00-00-00 according to IEEE802.1D, as shown in FIG. 16C.

Returning to FIG. 2, the frame determining portion 33 determines whether the received frame from the reception port determining portion 31 or the VLAN tag stacking portion 32 is a data frame or a control frame (BPDU) (S11 in FIG. 4). This determination is performed on the basis of the destination MAC address of the frame. When the destination MAC address is 0x01-80-C2-00-00-00, for example, the frame is determined as a BPDU (S11 in FIG. 4).

Furthermore, in this embodiment BPDUs are divided into VLAN tag-stacked BPDUs stacked with a VLAN tag by the VLAN tag stacking portion 32, and no-VLAN-tag BPDUs not stacked with a VLAN tag, transmitted from the reception port determining portion 31. In other words, a BPDU inputted from a user network is a VLAN tag-stacked BPDU, and a BPDU transceived over the carrier network 3 alone is a no-VLAN-tag BPDU.

Hence, by determining whether or not a VLAN tag is stacked onto the received frame, the frame determining portion 33 determines whether the received frame is a VLAN tag-stacked BPDU or a no-VLAN-tag BPDU (S12 in FIG. 4).

As a result of this determination, data frames are passed to the data frame transfer portion 35 (S14 in FIG. 4), VLAN tag-stacked BPDUs are passed to the VLAN filtering control portion 37 (S13 in FIG. 4), and no-VLAN-tag control frames are passed to the control frame processing portion 34 (S15 in FIG. 4).

Since only no-VLAN-tag BPDUs are passed to the control frame processing portion 34, user network BPDUs and carrier network BPDUs can be processed separately, which means that the spanning trees of the user networks and the spanning tree of the carrier network can be constructed independently.

Note that in this embodiment, as described above, a control frame is assumed to be a BPDU, and frames other than BPDUs are assumed to be data frames.

The data frame transfer portion 35 passes the received frame provided by the frame determining portion 33 to the MAC filtering control portion 36, and in accordance with the received frame provided by the VLAN filtering control portion 37 and the route information thereof, transfers the data frame to the transmission port determining portion 38.

The MAC filtering control portion 36 performs data frame filtering processing based on the destination MAC address in the MAC header of the received frame provided by the data frame transfer portion 35 and a preset MAC address filtering table, and thereby determines the ports to which transfer is possible. After determining the transfer-possible ports, the received frame is passed to the VLAN filtering control portion 37.

FIG. 14 shows the MAC address filtering table of the node 3a, and FIG. 15 shows the MAC address filtering table of the node 3b. The MAC address filtering table comprises a destination MAC address and a transfer flag for each port. Ports having a port transfer flag indicating one are capable of receiving transferred frames having a corresponding destination MAC address, whereas ports having a port transfer flag indicating zero are not capable of receiving transferred frames having a corresponding destination MAC address.

In FIG. 14, for example, a frame having a destination MAC address of 00-E0-00-00-11-01 may be transferred to the port having the port number 1. A frame having a destination MAC address of 01-80-C2-00-00-00 may be transferred to all of the ports having the port numbers 1 to 3. Note that in the node 3b shown in FIG. 1, only two ports, having the port numbers 1 and 2, are shown, whereas in FIG. 15, a port having the port number 3 is shown. The port having the port number 3 has been omitted from the drawing in FIG. 1.

Returning to FIG. 2, the VLAN filtering control portion 37 performs filtering processing on the data frame from the MAC filtering control portion 36 and the VLAN tag-stacked BPDU from the frame determining portion 33 on the basis of the VLAN-ID of the VLAN tag stacked onto the received frame and a preset VLAN filtering table, and thereby determines the ports to which the frames may be transferred.

In this embodiment, VLAN tag-stacked BPDUs are also subjected to filtering processing by the VLAN filtering control portion 37, similarly to data frames. Once the ports to which the received frame may be transferred have been determined, the received frame is passed to the data frame transfer portion 35 together with route information.

FIG. 9 shows the VLAN filtering table of the node 3a, FIG. 11 shows the VLAN filtering table of the node 3b, and FIG. 13 shows the VLAN filtering table of the node 3c. The VLAN filtering table comprises a VLAN-ID and a port transfer flag for each port. Ports having a port transfer flag indicating one may receive transferred frames having a corresponding VLAN-ID, whereas ports having a port transfer flag indicating zero cannot receive transferred frames having a corresponding VLAN-ID. In FIG. 9, for example, a frame having a VLAN-ID=1 can be transferred to the ports having the port numbers 1 and 3, but cannot be transferred to the port having the port number 2.

In other words, the VLAN filtering control portion 37 determines the port numbers of the ports to which the received frame can be transferred from the VLAN filtering table (S21 in FIG. 5). Next, the VLAN filtering control portion 37 determines whether or not the determined transfer-possible ports exist (S22 in FIG. 5). When the port transfer flag is at zero for all ports, it is determined that no transfer-possible ports exist. In this case, the VLAN filtering control portion 37 discards the frame (S27 in FIG. 5). In this manner, frame filtering is performed.

If the transfer-possible ports exist, the VLAN filtering control portion 37 determines whether or not the transfer-possible ports include a reception port (S23 in FIG. 5).

When a reception port is included, the frame is not transferred to the reception port, and hence the VLAN filtering control portion 37 deletes (excludes) the reception port number from the route information (transfer-possible port numbers) (S24 in FIG. 5). If a reception port is not included, the processing of the step S24 is skipped.

Next, the VLAN filtering control portion 37 notifies the data frame transfer portion 35 of the determined route information (port number) (S25 in FIG. 5), and passes the received frame to the data frame transfer portion 35 (S26 in FIG. 5).

A VLAN tag-stacked BPDU is passed directly to the VLAN filtering control portion 37 without being inputted into the MAC filtering control portion 36, and therefore the port number determined by the VLAN filtering control portion 37 serves as route information, In the case of a data frame, on the other hand, a port number comprising both the port number determined by the MAC filtering control portion 36 and the port number determined by the VLAN filtering control portion 37 (AND condition) serves as the route information.

Note that a VLAN tag-stacked BPDU may also be passed from the frame determining portion 33 to the MAC filtering control portion 36 and subjected to filtering processing by both the MAC filtering control portion 36 and VLAN filtering control portion 37. In this case, all of the ports are set as ports to which the BPDU may be transferred, as shown in the MAC address filtering table in FIG. 14, so that the same route information as the result of filtering processing performed by the VLAN filtering control portion 37 alone can be obtained.

In so doing, VLAN filtering processing according to the VLAN-ID is performed on a BPDU stacked with a VLAN tag in the VLAN filtering control portion similarly to a data frame. As a result, the VLAN tag-stacked BPDU is transmitted to all of the ports registered in the VLAN.

The transmission port determining portion 38 determines whether or not the port to which the frame provided by the data frame transfer portion 35 or control frame processing portion 34 is to be transmitted is connected to a user network on the basis of the aforementioned user network connection determining table (see FIGS. 7, 10, 12) (S31 in FIG. 6). When the transmission port is not connected to a user network (N in S31 of FIG. 6), the transmission port determining portion 38 executes transmission processing to transmit the frame as is (S33 in FIG. 6), and when the transmission port is connected to a user network (Y in S31 of FIG. 6), the transmission port determining portion 38 passes the frame to the VLAN tag deleting portion 39 (S32 in FIG. 6).

The VLAN tag deleting portion 39 removes (deletes) the VLAN tag of the received frame from the frame, and following deletion, transmits the frame to the corresponding port. The frame is then transferred to the user network.

The frame is transmitted to the user network after having its VLAN tag deleted by the VLAN tag deleting portion 39, and therefore the processing of the VLAN tag deleting portion 39 is egress node-specific processing. Frames from which the VLAN tag has been deleted return to the data structure prior to VLAN tag stacking, as shown in FIG. 16A.

The control frame processing portion 34 determines the type of control frame on the basis of the destination MAC address in the MAC header of the received frame, and performs control and management processing on each control frame. When the control frame is a BPDU, for example, spanning tree construction processing is executed.

[BPDU Transmission Processing]

Next, BPDU transmission processing, which is executed by the node having the constitution shown in FIG. 2, will be described. As an example, a case in which a BPDU is transferred from the bridge 11b of the user network 11 to the bridge 12b of the user network 12 will be described.

Note that in order to differentiate between the nodes 3a to 3c, the constitutional elements 31 to 39 of the node shown in FIG. 2 have been attached with the reference symbol "a" following the reference numeral of FIG. 2 to indicate a constitutional element of the node 3a, the reference symbol "b" following the reference numeral of FIG. 2 to indicate a constitutional element of the node 3b, and the reference symbol "c" following the reference numeral of FIG. 2 to indicate a constitutional element of the node 3c. For example, the reception port determining portion 31 of the node 3a is denoted as "reception port determining portion 31a".

FIG. 17 shows a condition in which a BPDU is transmitted over the wide range LAN shown in FIG. 1. As an example, the MAC addresses 00-E0-00-00-11-01, 00-E0-00-00-11-11, and 00-E0-00-00-22-11 are allocated to the user terminal 11c, the bridge 11b, and the bridge 21a respectively. Further, the MAC addresses 00-E0-00-00-11-02, 00-E0-00-00-11-22, and 00-E0-00-00-22-22 are allocated to the user terminal 12c, the bridge 12b, and the bridge 22a respectively.

A BPDU (no-VLAN-tag BPDU) 41 transmitted from the bridge 11b is received in the port having the port number 1 of the node (ingress node) 3a. The destination MAC address of the BPDU 41 is a MAC address 01-80-C2-00-00-00 allocated to the BPDU, and the source MAC address is the MAC address 00-E0-00-00-11-11 of the bridge 11b. The BPDU 41 is not stacked with a VLAN tag, and hence the BPDU 41 has the data structure shown in FIG. 16A.

The reception port determining portion 31a of the node 3a determines whether or not the port having the reception port number 1 is connected to a user network on the basis of the user network connection determining table (see FIG. 7). The port having the reception port number 1 is connected to a user network, and therefore the reception port determining portion 31a passes the BPDU 41 to the VLAN tag stacking portion 32a.

In order to transfer the BPDU 41 transparently, the VLAN tag stacking portion 32a stacks the BPDU 41 with a VLAN tag including a VLAN-ID=1, corresponding to the port number 1, on the basis of the VLAN-ID table (see FIG. 8). The BPDU stacked with the VLAN tag is set as a BPDU 42. The BPDU 42 has the data structure shown in FIGS. 16B and 16C. The BPDU 42 is passed to the frame determining portion 33a.

The frame determining portion 33a determines that the received frame is a BPDU on the basis of the destination MAC address 01-80-C2-00-00-00 in the MAC header of the frame. Further, the frame determining portion 33a determines that the received frame is a VLAN tag-stacked BPDU due to the presence of the VLAN tag in the frame, and therefore passes the BPDU 42 to the VLAN filtering control portion 37a.

The VLAN tag-stacked BPDU is not passed to the control frame processing portion 34a, and is therefore used to construct the spanning trees of only the user networks 11 and 12, and not the spanning tree of the carrier network 3.

Note that a VLAN tag is not stacked onto a BPDU within the carrier network 3 that is not inputted from a user network. Therefore, the no-VLAN-tag BPDU is passed to the control frame processing portion 34a and used to construct the spanning tree of the carrier network 3, similarly to a conventional bridge function.

Next, the VLAN filtering control portion 37a refers to the VLAN filtering table (see FIG. 9) to determine the port numbers of the transfer-possible ports on the basis of the port transfer flags corresponding to the VLAN-ID=1 of the BPDU 42. It can be seen from FIG. 9 that the port numbers of the transfer-possible ports are 1 and 3.

The BPDU 42 is not transferred from the port number 1 from which the BPDU 41 was received. Hence, the VLAN filtering control portion 37a excludes the reception port number 1 from the port numbers 1 and 3, and notifies the data frame transfer portion 35a of the port number 3 as route information. The VLAN filtering control portion 37a then passes the BPDU 42 to the data frame transfer portion 35a.

Note that here, a single port number is determined as the route information, but when a plurality of port numbers is determined as the route information, the BPDU 42 is transmitted (broadcast) from a plurality of ports. This is similar in the intermediate node and egress node.

The data frame transfer portion 35a determines the transmission port on the basis of the route information notified by the VLAN filtering control portion 37a, and passes the BPDU 42 to the transmission port determining portion 38a corresponding to the determined transmission port.

The transmission port determining portion 38a determines whether or not the transmission port corresponding to the route information (port number 3) is connected to a user network on the basis of the user network connection determining table (see FIG. 7). The port number 3 is not connected to a user network, and therefore the transmission port determining portion 38a performs transmission processing on the BPDU 42 to transmit the BPDU 42 from the port having the port number 3. Having been transmitted from the port number 3, the BPDU 42 is transmitted to the node 3b.

Thus in the ingress node 3a, a VLAN tag is stacked onto the BPDU 41, and a transmission port is determined by filtering processing according to the VLAN-ID. As a result, the BPDU can be transferred over the carrier network 3 without affecting the spanning tree inside the carrier network 3 or the spanning trees of the user networks 21 and 22 of the user B.

The BPDU 42 is received in the port having the port number 1 of the node (intermediate node) 3b. The reception port determining portion 31b of the node 3b determines whether or not the reception port is connected to a user network on the basis of the user network connection flag corresponding to the port number 1 in the user network connection determining table (see FIG. 10). The reception port having the port number 1 is not connected to a user network, and therefore the reception port determining portion 31b passes the VLAN tag-stacked BPDU 42 to the frame determining portion 33b.

The frame determining portion 33b determines the transfer destination of the BPDU 42 as the VLAN filtering control portion 37b on the basis of the destination MAC address and the presence of a VLAN tag in the MAC header of the BPDU 42. Hence, similarly to the ingress node 3a, the BPDU 42 is not passed to the control frame processing portion 34b. Accordingly, the BPDU 42 is not used to construct the spanning tree within the carrier network 3, and therefore does not affect the construction of this spanning tree.

The VLAN filtering control portion 37b determines the transfer-possible port numbers on the basis of the port transfer flags corresponding to the VLAN-ID=1 in the VLAN filtering table (see FIG. 11). From FIG. 11, it can be seen that the transfer-possible port numbers are 1 and 2, but since the BPDU is not transferred to a reception port, the port number 1 is excluded. Hence the VLAN filtering control portion 37b notifies the data frame transfer portion 35b of the port number 2 as route information, and passes the BPDU 42 to the data frame transfer portion 35b.

The data frame transfer portion 35b determines the transmission port on the basis of the route information notified by the VLAN filtering control portion 37b, and passes the BPDU 42 to the transmission port determining portion 38b of the determined transmission port.

The transmission port determining portion 38b determines whether or not the transmission port is connected to a user network on the basis of the user network connection flag corresponding to the route information (port number 2) in the user network connection determining table (see FIG. 10). From FIG. 10, it can be seen that the port number 2 is connected to the node 3c of the carrier network 3, and not connected to a user network. Hence the transmission port determining portion 38b performs transmission processing on the BPDU 42 to transmit the BPDU 42 from the port having the port number 2.

Thus the intermediate node 3b determines the transmission port of the VLAN tag-stacked BPDU 42 by filtering according to the VLAN-ID, and hence the BPDU received from the user network 11 is transferred over the carrier network 3 without terminating at the intermediate node 3b.

Furthermore, in the intermediate node, no-VLAN-tag BPDUs and VLAN tag-stacked BPDUs are processed separately, and hence user network BPDUs and carrier network BPDUs can be transferred separately.

Having been transmitted from the port number 2 of the node 3b, the BPDU 42 is received in the port having the port number 2 of the node (egress node) 3c.

The reception port determining portion 31c of the egress node 3c determines whether or not the reception port is connected to a user network on the basis of the user network connection flag corresponding to the reception port number 1 in the user network connection determining table (see FIG. 12). From FIG. 12, it can be seen that the port having the port number 1 is not connected to a user network 1, and therefore the reception port determining portion 31c passes the BPDU 42 to the frame determining portion 33c.

The frame determining portion 33c confirms the destination MAC address and the presence of a VLAN tag in the MAC header, and passes the BPDU 42 to the VLAN filtering control portion 37c. Hence, similarly to the nodes 3a and 3b, the VLAN tag-stacked BPDU 42 is not used to construct the spanning tree within the carrier network 3, and therefore does not affect the construction of this spanning tree.

The VLAN filtering control portion 37c determines the transfer-possible port numbers on the basis of the port transfer flags corresponding to the VLAN-ID=1 in the VLAN filtering table (see FIG. 13). From FIG. 13, it can be seen that the transfer-possible port numbers are 1 and 2, but since the BPDU 42 is not transferred to a reception port, the port number 1 is excluded. Hence the VLAN filtering control portion 37c notifies the data frame transfer portion 35c of the port number 2 as route information, and passes the BPDU 42 to the data frame transfer portion 35c.

The data frame transfer portion 35c determines the transmission port on the basis of the route information notified by the VLAN filtering control portion 37c, and passes the BPDU 42 to the transmission port determining portion 38c of the determined transmission port.

The transmission port determining portion 38c determines whether or not the transmission port is connected to a user network on the basis of the user network connection flag corresponding to the route information (port number 2) in the user network connection determining table (see FIG. 12). From FIGS. 12 and 17, it can be seen that the port number 2 is connected to the user network 12 (bridge 12b), and hence the transmission port determining portion 38c passes the BPDU 42 to the VLAN tag deleting portion 39c.

The VLAN tag deleting portion 39c deletes the VLAN tag from the VLAN tag-stacked BPDU 42. Once the VLAN tag has been deleted, the BPDU is set as a BPDU 43. The BPDU 43 has the data structure shown in FIG. 16A. The VLAN tag deleting portion 39c transmits the BPDU 43 from the port having the port number 2 in accordance with the route information. The transmitted BPDU 43 is received in the bridge 12b of the user network 12.

Thus in the egress node 3c, the transmission port of the VLAN tag-stacked BPDU 42 is determined by filtering processing according to the VLAN-ID, and the VLAN tag-deleted BPDU 43 is transmitted to the bridge 12b of the user network 12. In this manner, a BPDU from the bridge 11b can be transferred between user networks transparently.

Here, transmission of a BPDU from the user network 11 of the user A was described, but a BPDU from the user network 12 of the user A is transmitted/transferred to the user network 11 of the user A similarly. BPDU transmission from the user network 21 and the user network 22 of the user B is also performed similarly.

Thus a BPDU from a user network is transferred over the carrier network 3 and delivered to a user network of the same user. As a result, the spanning tree of each user network can be constructed without affecting the other user networks or the carrier network.

Figure 18:
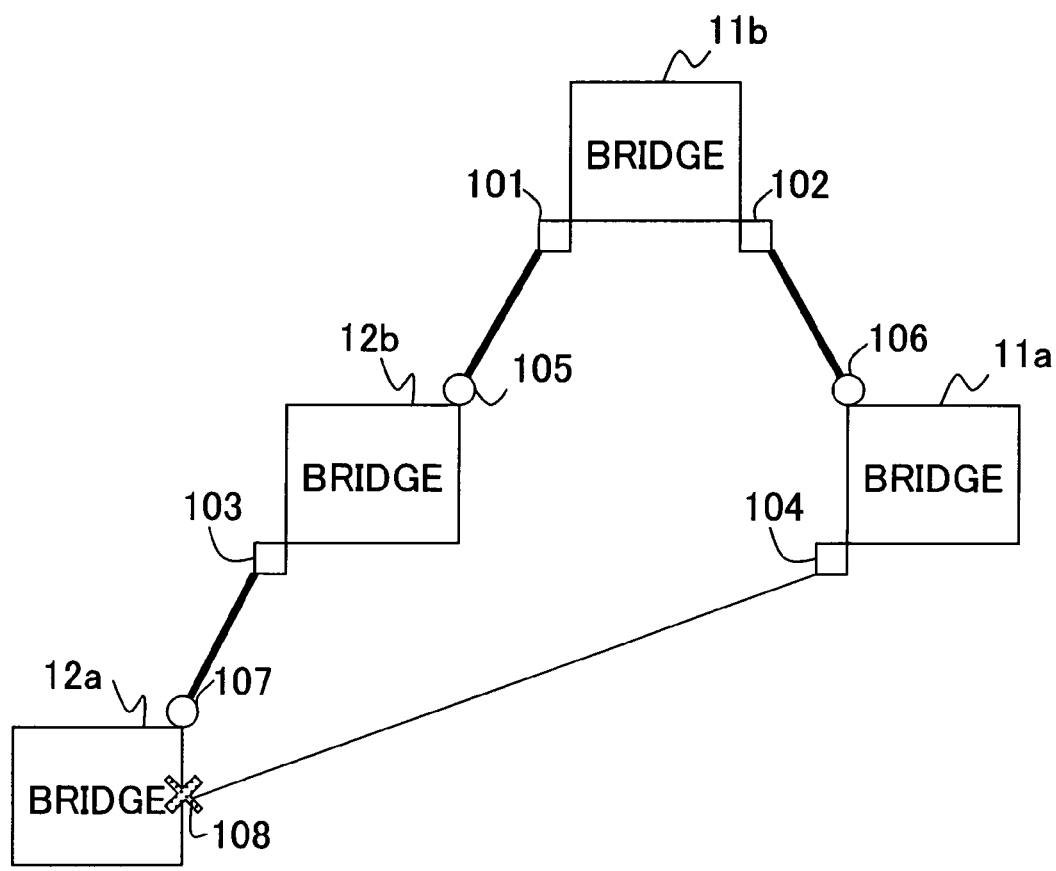
FIG. 18 shows the structure of a spanning tree in a user network of a user A.

Further, a BPDU from a user network is transferred over the carrier network 3, and hence the spanning tree of the user network can be constructed without loops. For example, FIG. 18 shows the structure of the spanning tree of the user networks 11 and 12 that is constructed upon transmission of the BPDU described above.

In this spanning tree, the lower bridges 11a and 12b are connected to the root bridge 11b, and the lower bridge 12a is connected to the bridge 12b. A blocking port is provided at the tree connection from the bridge 11a to the bridge 12a. The reference numerals 101 to 104 denote representative ports, the reference numerals 105 to 107 denote root ports, and the reference numeral 108 denotes a blocking port.

When a frame is transmitted from the bridge 11a by broadcasting, the frame passing from the bridge 11a to the bridge 12a is destroyed by the blocking port. As a result, the generation of a loop is avoided.

Figure 19:
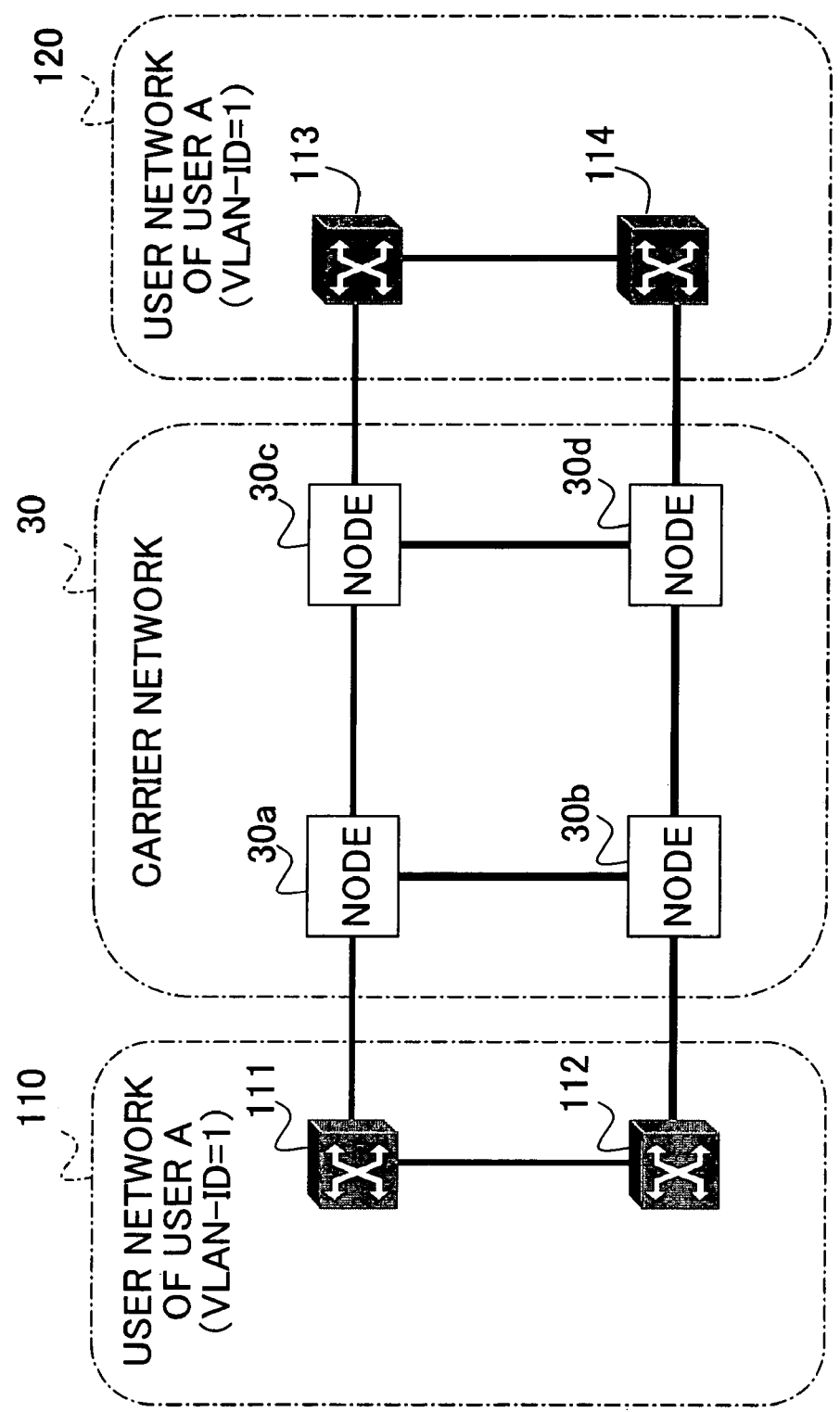
FIG. 19 is a block diagram showing an example of a network configuration of a wide range LAN.

Next, taking the wide range LAN shown in FIG. 19 as an example, processing for constructing the spanning trees of the carrier network and user networks by means of BPDU transmission will be described.

User networks (LANs) 110 and 120 of the user A are connected via a carrier network 30, and thus a wide range LAN (VLAN) of the user A is formed across the carrier network 30.

The carrier network 30 comprises nodes 30a to 30d. The user network 110 comprises bridges 111 and 112, and the user network 120 comprises bridges 113 and 114. The constitution and processing of the nodes 30a to 30d are identical to those of the nodes 3a to 3d shown in FIG. 2, and therefore detailed description of the nodes 30a to 30d has been omitted.

First, an operation performed when a spanning tree is constructed in the carrier network will be described. In the following description, the constitutional elements of the nodes 30a to 30d are indicated by adding the reference symbols a to d to the reference numerals shown in FIG. 2.

When the node 30a transmits a BPDU (no-VLAN-tag BPDU), the BPDU is received in the adjacent nodes 30b and 30c.

The reception port determining portion 31b of the node 30b determines whether or not the reception port of the BPDU is connected to a user network. The reception port is connected to the node 30a of the carrier network 30 and not connected to a user network, and hence the BPDU is passed to the frame determining portion 33b without being subjected to stacking processing by the VLAN tag stacking portion 32b.

The BPDU passed from the reception port determining portion 31b is a no-VLAN-tag BPDU, and hence the frame determining portion 33b passes the BPDU to the control frame processing portion 34b.

The control frame processing portion 34b performs processing to construct the spanning tree of the carrier network 30 on the basis of the received BPDU. Spanning tree construction is performed by a similar operation to that of the background art, and hence description thereof has been omitted.

By means of the spanning tree construction processing, the control frame processing portion 34b passes the BPDU to be transmitted from ports (transmission port) excluding reception ports to the transmission port determining portion 38b. The transmission ports are connected to the node 30d and the bridge 112 of the user network 110.

The transmission port determining portion 38b determines whether or not the transmission ports are connected to a user network on the basis of the user network connection determining table (see FIGS. 7, 10, 12). The transmission port determining portion 38b then transmits the BPDU as is to the transmission port which is not connected to a user network (the port connected to the node 30d), and does not transmit the BPDU to the transmission port which is connected to a user network (the bridge 112).

Note that frame transmission permission may be set in the node according to the presence of a VLAN tag according to a conventional function. In so doing, setting may be performed to ensure that no-VLAN-tag BPDUs are not transmitted to the user network side.

Thus the BPDU of the carrier network 30 is not transmitted to the user network, and has no effect on the construction of the user network spanning trees.

Upon reception of the BPDU from the node 30b, the node 30d performs spanning tree construction processing by means of similar processing to that performed by the node 30b. The node 30c also performs spanning tree construction processing by means of similar processing to that performed by the node 30b upon reception of the BPDU from the node 30a.

Figure 20:
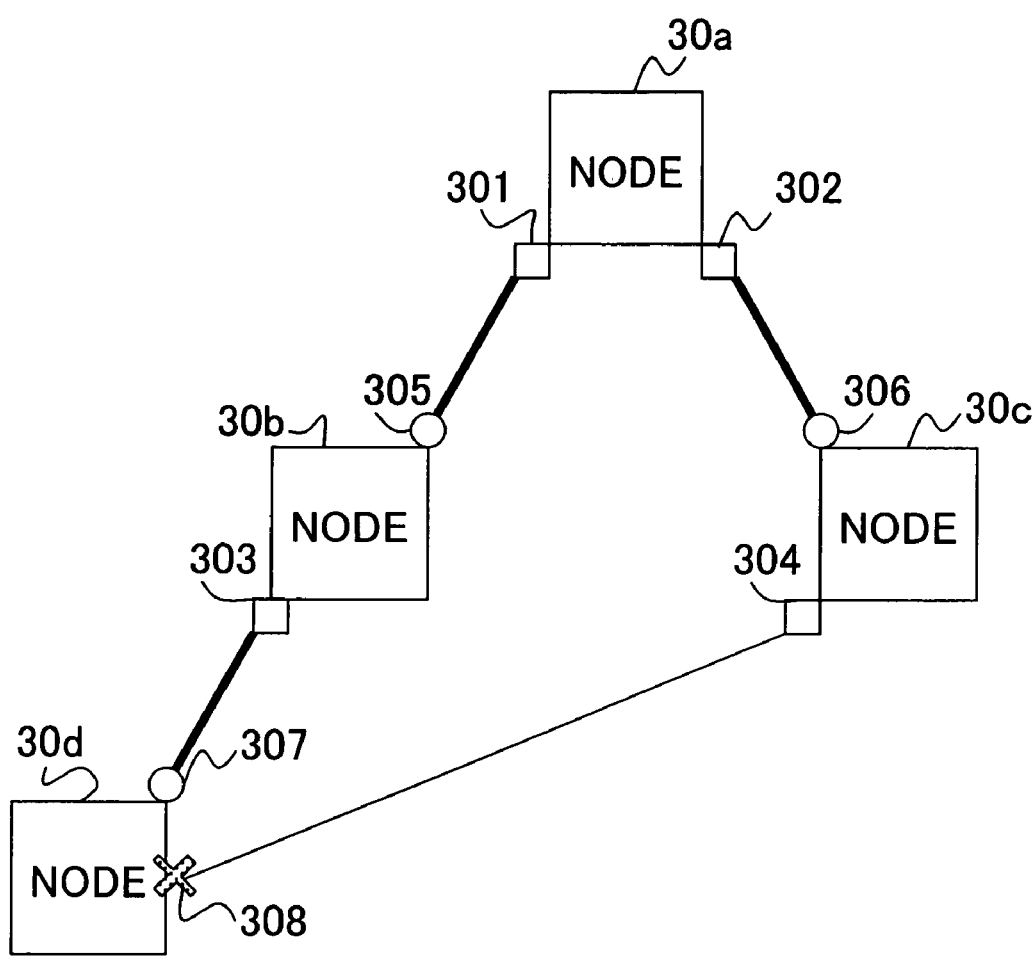
FIG. 20 shows the structure of a spanning tree in a carrier network.

The spanning tree of the carrier network 30 is constructed by repeating this processing in each node in the carrier network 30. FIG. 20 shows the structure of the spanning tree in the carrier network 30. The nodes 30b and 30c are connected below the root node 30a, and the node 30d is connected below the node 30b. A blocking port is provided at the tree connection from the node 30c to the node 30d. The reference numerals 301 to 304 denote representative ports, the reference numerals 305 to 307 denote root ports, and the reference numeral 309 denotes a blocking port. Thus the generation of a loop is avoided.

Note that the processing in each node of a data frame does not affect construction of the spanning tree, and hence description thereof has been omitted.

Meanwhile, processing to construct the spanning trees of the user networks 110 and 120 of the user A is performed similarly to that described with reference to FIG. 17. In other words, a VLAN tag is stacked onto a BPDU transmitted from one of the user networks 110 (120) to the carrier network 30 at the ingress node. The VLAN tag-stacked BPDU is then transferred transparently over the carrier network 30. The VLAN tag is removed at the egress node, and the BPDU is delivered to the other user network 120 (110). Hence individual spanning trees are constructed for the user networks 110 and 120 without affecting the spanning tree in the carrier network 30.

By determining the presence of a VLAN tag in a received BPDU, independent spanning trees can be constructed in the user networks spanning the carrier network and the carrier network.

Note that the processing of the node was described using a BPDU as an example of a control frame, but similar processing may be executed on another control frame (GVRP, GMRP, etc.).

Further, similarly to conventional VLAN over VLAN technology, a VLAN tag is stacked onto a data frame transmitted to the carrier network from a user network at the ingress node, whereupon the frame is transferred to the carrier network. The stacked VLAN tag is removed at the egress node, whereupon the frame is transmitted to a user network. The processing that is performed on the data frame is similar to conventional processing, and hence description thereof has been omitted.

Second Embodiment

[Node Constitution of Carrier Network]

Figure 21:
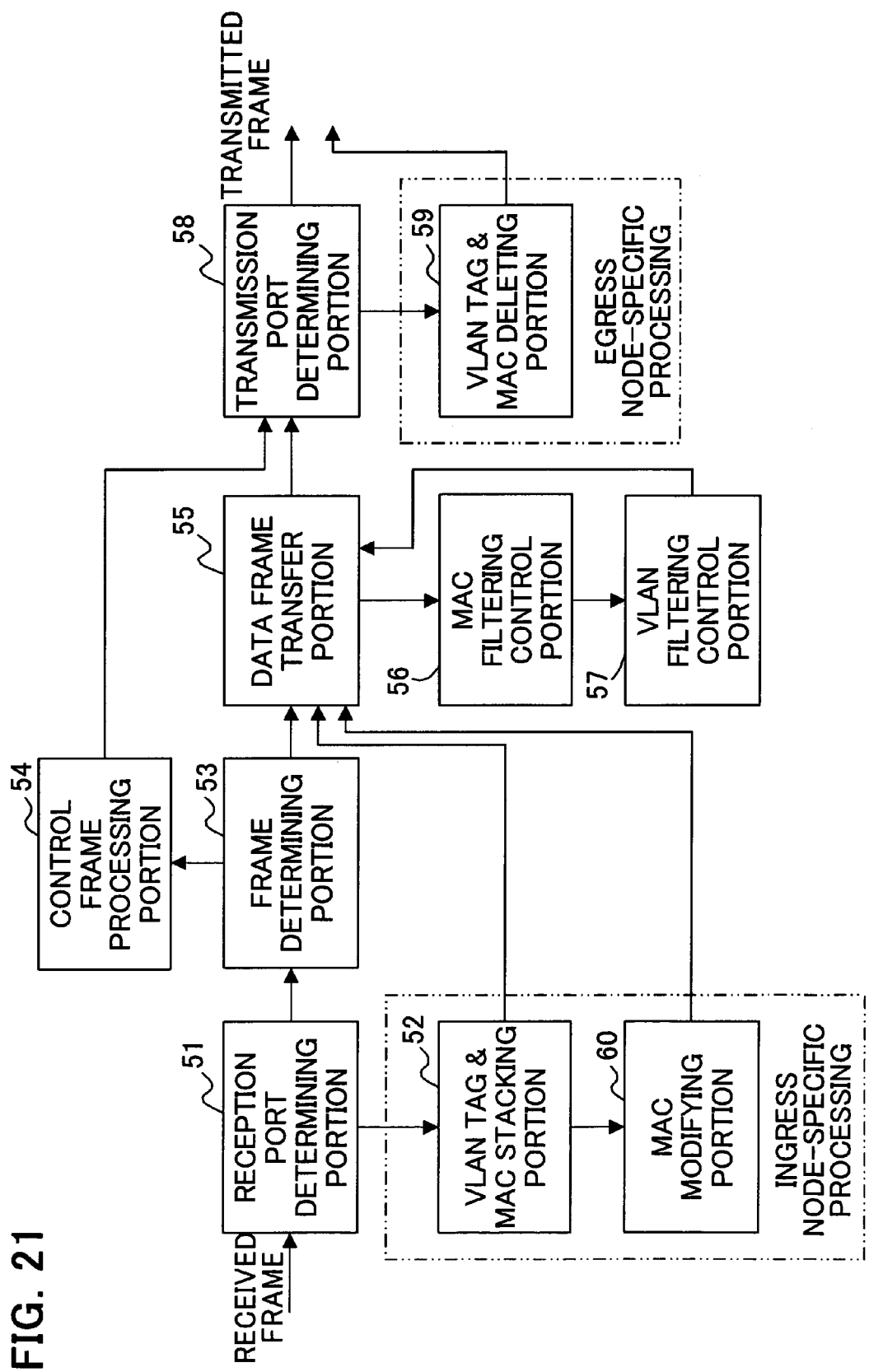
FIG. 21 is a block diagram showing in detail the constitution of a node in a carrier network according to a second embodiment of the present invention.
Figure 22:
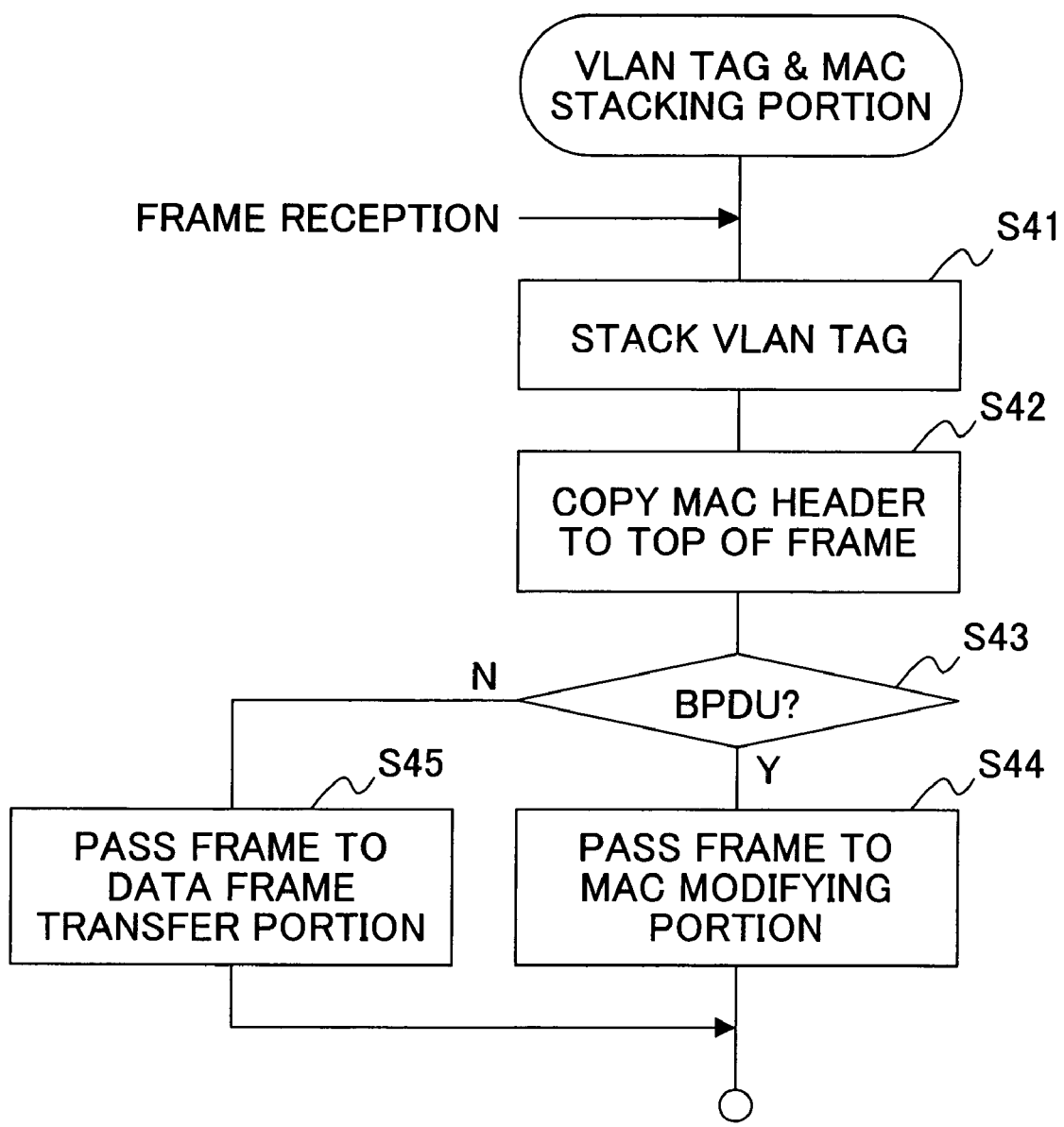
FIG. 22 is a flowchart showing a processing flow of a VLAN tag and MAC stacking portion of the node.
Figure 23:
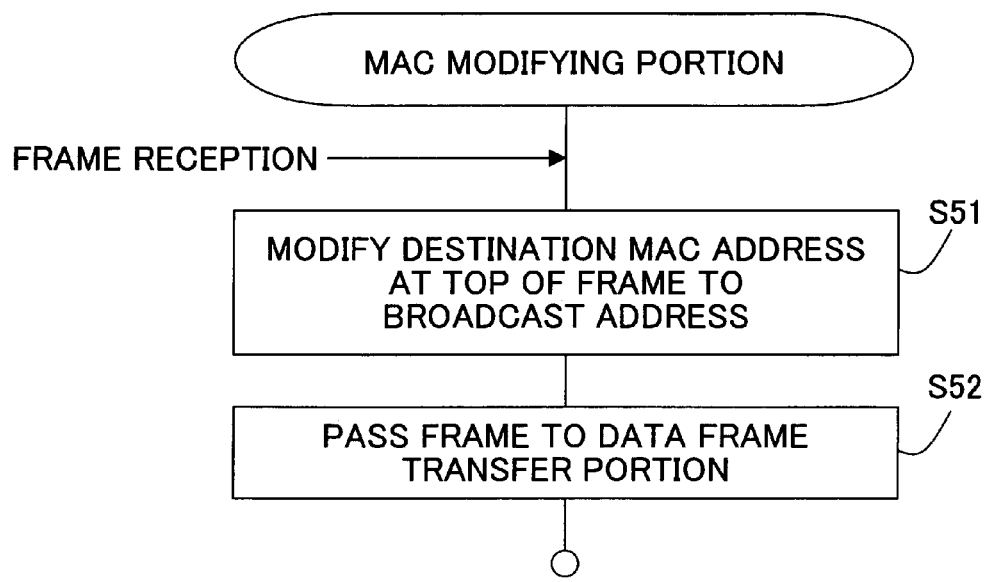
FIG. 23 is a flowchart showing a processing flow of a MAC modifying portion of the node.
Figure 24:
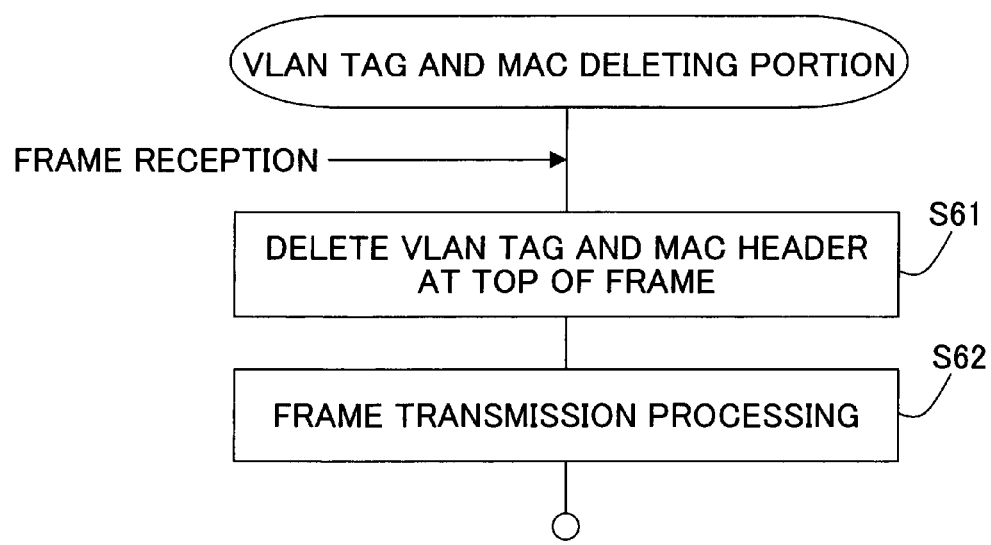
FIG. 24 is a flowchart showing a processing flow of a VLAN tag and MAC deleting portion of the node.

FIG. 21 is a block diagram showing in detail the constitution of a node according to a second embodiment of the present invention. FIG. 22 is a flowchart showing the processing flow of a VLAN tag and MAC stacking portion of the node. FIG. 23 is a flowchart showing the processing flow of a MAC modifying portion of the node. FIG. 24 is a flowchart showing the processing flow of a VLAN tag and MAC deleting portion of the node.

The node comprises a reception port determining portion 51, a VLAN tag and MAC stacking portion 52, a MAC modifying portion 60, a frame determining portion 53, a control frame processing portion 54, a data frame transfer portion 55, a MAC filtering control portion 56, a VLAN filtering control portion 57, a transmission port determining portion 58, and a VLAN tag and MAC deleting portion 59.

The reception port determining portion 51 performs similar processing to the reception port determining portion 31 of the first embodiment. When the reception port of the frame is connected to a user network, the frame is passed to the VLAN tag and MAC stacking portion 52, and when the reception port of the frame is not connected to a user network, the frame is passed to the frame determining portion 53.

The frame determining portion 53 determines whether the received frame is a data frame or a control frame (a BPDU here) on the basis of the destination MAC address in the MAC header of the received frame. The frame determining portion 53 passes data frames to the data frame transfer portion 55, and passes BPDUs to the control frame processing portion 54.

The data frame transfer portion 55 and the MAC filtering control portion 56 are identical to the data frame transfer portion 35 and MAC filtering control portion 36 of the first embodiment respectively, and hence description thereof has been omitted.

The VLAN filtering control portion 57 performs filtering processing on the data frame on the basis of the VLAN-ID of the VLAN tag stacked onto the received frame, and thereby determines the transfer-possible ports.

The transmission port determining portion 58 and control frame processing portion 54 are identical to the transmission port determining portion 38 and control frame processing portion 34 of the first embodiment respectively, and hence description thereof has been omitted.

The VLAN tag and MAC stacking portion 52 stacks a VLAN tag comprising a VLAN-ID corresponding to the reception port onto the received frame (S41 in FIG. 22). The VLAN tag and MAC stacking portion 52 then copies the MAC header of the received frame to the top of the received frame (S42 in FIG. 22).

Next, the VLAN tag and MAC stacking portion 52 determines whether the received frame is a data frame or a control frame (BPDU) on the basis of the destination MAC address of the received frame (S43 in FIG. 22). If the received frame is determined to be a BPDU (Y in S43 of FIG. 22), the VLAN tag and MAC stacking portion 52 passes the frame to the MAC modifying portion 60 (S44 in FIG. 22), and if the received frame is determined to be a data frame (N in S43 of FIG. 22), the VLAN tag and MAC stacking portion 52 passes the frame to the data frame transfer portion 55 (S45 in FIG. 22).

The MAC modifying portion 60 modifies the destination MAC address in the MAC header, copied to the top of the received frame by the VLAN tag and MAC stacking portion 52, to a broadcast address FF-FF-FF-FF-FF-FF (S51 in FIG. 23), and passes the frame to the data frame transfer portion 55 (S52 in FIG. 23).

Figure 25A:
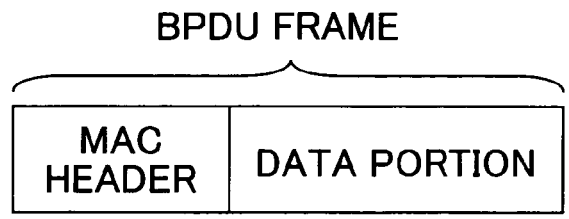
FIG. 25A shows a data structure of a BPDU.
Figure 25B:
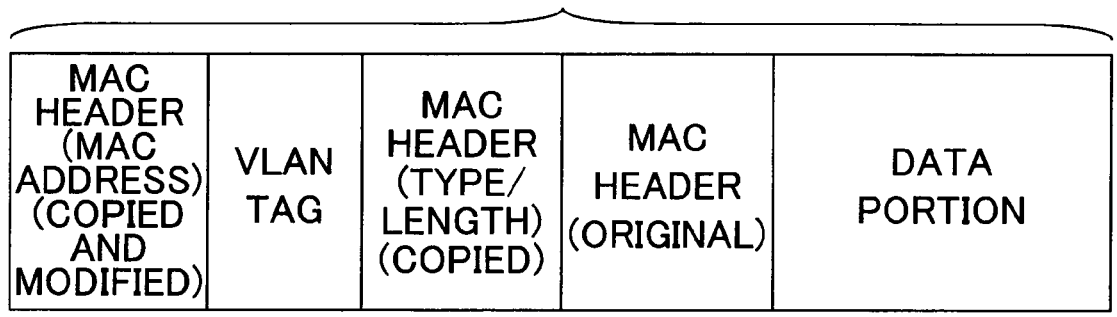
FIG. 25B shows a data structure of a BPDU to which a VLAN tag is stacked and a MAC header is copied.
Figure 25C:
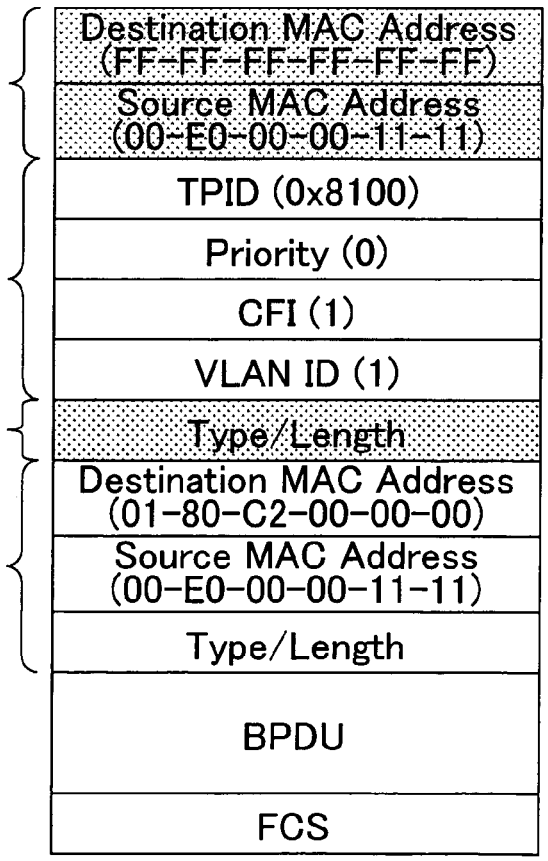
FIG. 25C shows the data structure of FIG. 25B in detail.

FIG. 25A shows the data structure of a BPDU, FIG. 25B shows the data structure of a BPDU onto which a VLAN tag has been stacked and a MAC header has been copied, and FIG. 25C shows the data structure of FIG. 25B in detail. Of the copied MAC header, the destination MAC address and source MAC address are disposed at the front of the frame (in other words, further toward the top than the stacked VLAN tag), and the type/length is disposed to the rear of the stacked VLAN tag (in other words, between the VLAN tag and the original MAC header). The copied destination MAC is modified to a broadcast address.

Figure 26A:
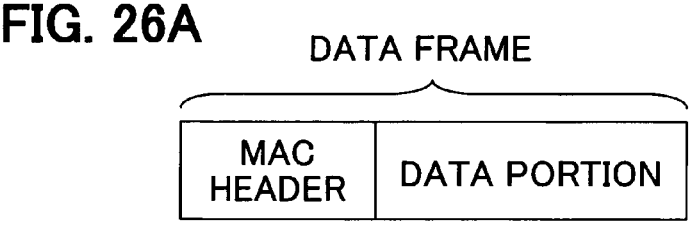
FIG. 26A shows a data structure of a data frame.
Figure 26B:
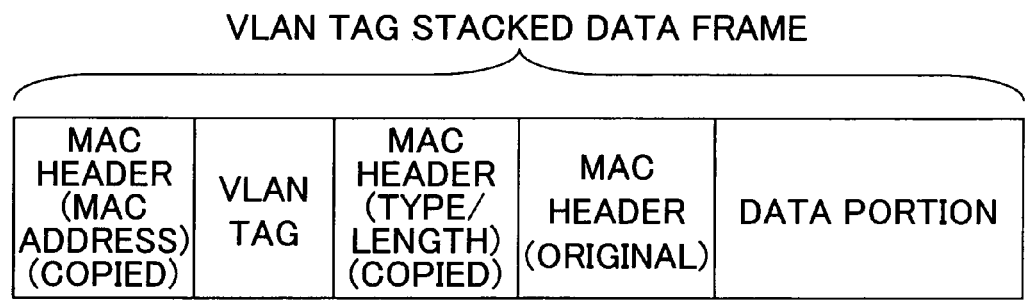
FIG. 26B shows a data structure of a data frame to which a VLAN tag is stacked and a MAC header is copied.
Figure 26C:
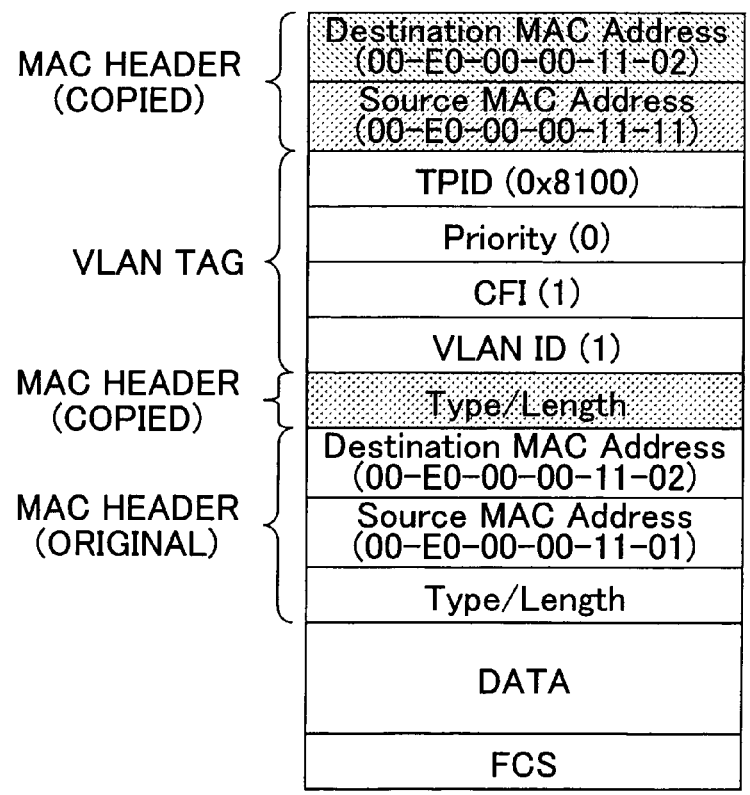
FIG. 26C shows the data structure of FIG. 26B in detail.
Figure 27:
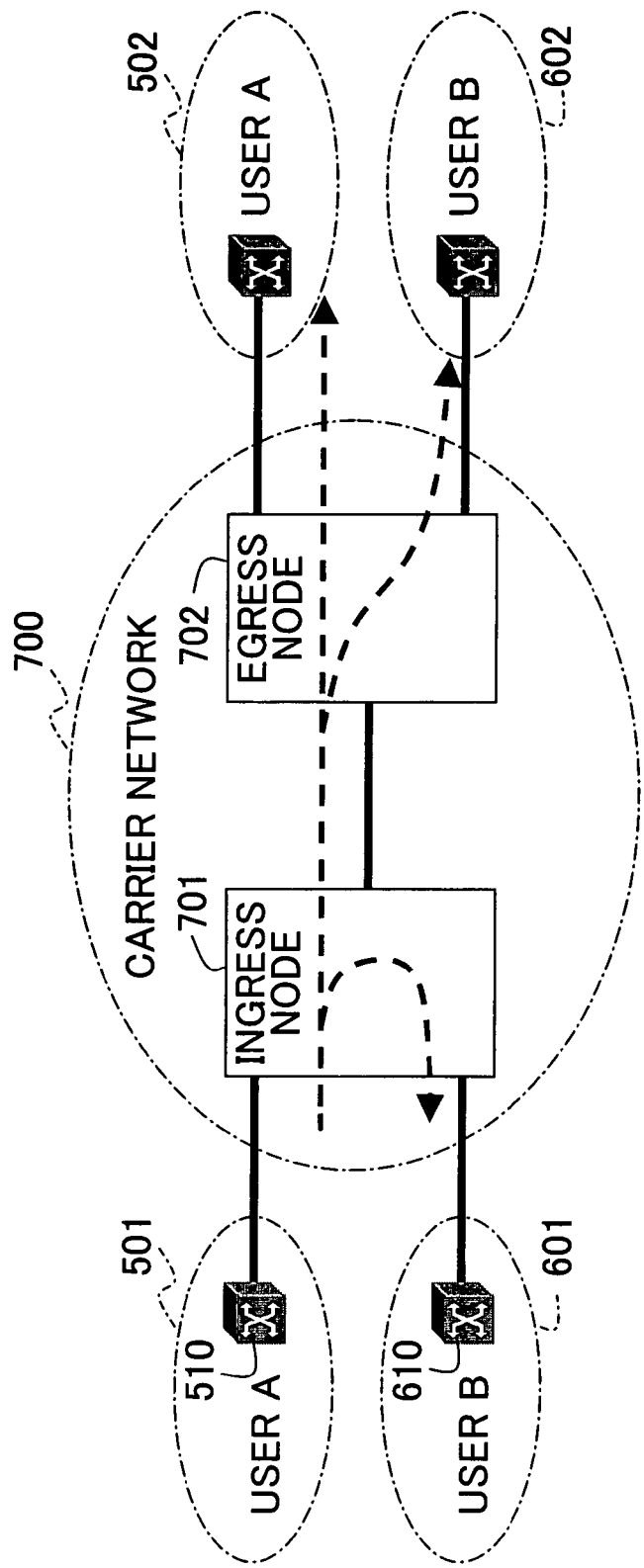
FIGS. 27 and 28 show schematic examples of the configuration of a wide range LAN, illustrating the background art.
Figure 28:
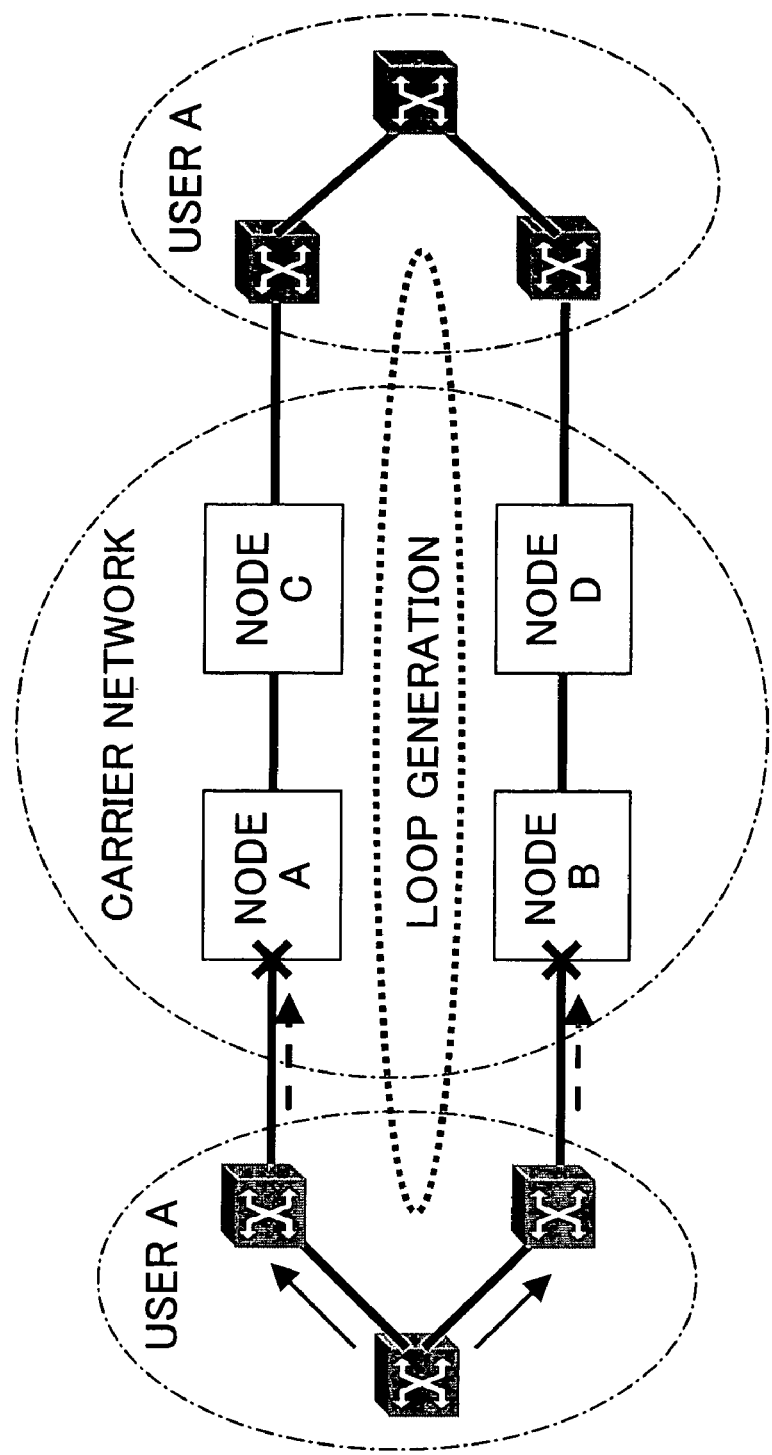

FIG. 26A shows the data structure of a data frame, FIG. 26B shows the data structure of a data frame onto which a VLAN tag has been stacked and a MAC header has been copied, and FIG. 26C shows the data structure of FIG. 26B in detail. VLAN tag stacking and MAC header copying are performed on a data frame in a similar fashion, but the data frame is not passed to the MAC modifying portion 60, and therefore the copied destination MAC address is not modified.

In this manner, BPDUs and data frames are encapsulated, with a copy of the MAC header and a VLAN tag attached to the header part thereof.

The VLAN tag and MAC deleting portion 59 deletes the VLAN tag of the received frame and the MAC header at the top of the frame (i.e. the copy of the MAC header) (S61 in FIG. 24), and transmits the frame from the transmission port (S62).

The processing of the VLAN tag and MAC stacking portion 52 and the MAC modifying portion 60 is ingress node-specific processing, whereas the processing of the VLAN tag and MAC deleting portion 59 is egress node-specific processing.

[BPDU Transmission Processing]

Next, similarly to the first embodiment, BPDU transmission processing will be described using the network configuration example in FIG. 17. To differentiate between the nodes 3a to 3c, the constitutional elements 51 to 60 of the node shown in FIG. 21 have been attached with the reference symbol "a" following the reference numeral of FIG. 21 to indicate a constitutional element of the node 3a, the reference symbol "b" following the reference numeral of FIG. 21 to indicate a constitutional element of the node 3b, and the reference symbol "c" following the reference numeral of FIG. 21 to indicate a constitutional element of the node 3c. For example, the reception port determining portion 51 of the node 3a is denoted as "reception port determining portion 51a".

A BPDU transmitted from the bridge 11b of the user network 11 is received in a port having the port number 1 of the node (ingress node) 3a in the carrier network 3. The reception port determining portion 51a of the node 3a determines whether or not the reception port is connected to a user network on the basis of the user network connection flag of the port number 1 in the user network connection determining table (see FIG. 7). The port having the port number 1 is connected to a user network, and therefore the reception port determining portion 51a passes the received frame to the VLAN tag and MAC stacking portion 52a.

In order to transfer the frame transparently, the VLAN tag and MAC stacking portion 52a stacks the received frame with a VLAN tag comprising a VLAN-ID=1 of the port number 1 in the VLAN-ID table (see FIG. 8). The VLAN tag and MAC stacking portion 52a also copies the MAC header (MAC address and type/length) of the received frame to the top of the received frame (see FIGS. 25B, 25C, 26A, 26C).

Next, the VLAN tag and MAC stacking portion 52a determines whether the received frame is a data frame or a control frame (BPDU) on the basis of the destination MAC address in the MAC header. The VLAN tag and MAC stacking portion 52a passes data frames to the data frame transfer portion 55a, and passes BPDUs to the MAC modifying portion 60a.

The MAC modifying portion 60a modifies the destination MAC address in the MAC header (copied MAC header) at the top of the VLAN tag-stacked BPDU 42 to the broadcast address FF-FF-FF-FF-FF-FF (see FIG. 25C), and passes the modified BPDU to the data frame transfer portion 55a.

The data frame transfer portion 55a passes the BPDU 42 provided by the MAC modifying portion 60a to the MAC filtering control portion 56a.

The MAC filtering control portion 56a determines transfer-possible ports on the basis of the port transfer flags corresponding to the destination MAC address FF-FF-FF-FF-FF-FF of the BPDU 42. From FIG. 14, it can be seen that all of the ports are transfer-possible ports. Note that the transfer-possible port of the data frame shown in FIG. 26C is the port having the port number 3.

The VLAN filtering control portion 57a determines the transfer-possible port numbers on the basis of the port transfer flags corresponding to the VLAN-ID=1 in the VLAN filtering table (see FIG. 9). It can be seen from FIG. 9 that the port numbers 1 and 3 are transfer-possible ports, but since the BPDU 42 is not transferred to a reception port, the port number 1 is excluded, and hence the port number 3 alone serves as route information.

From the transfer-possible ports determined by the MAC filtering control portion 56a and VLAN filtering control portion 57a, it can be seen that the route information of the VLAN tag-stacked BPDU 42 is the port number 3.

Note that the route information of the data frame is also the port number 3. Moreover, here a single port number is determined as the route information, but when a plurality of port numbers is determined as the route information, the BPDU 42 is transmitted (broadcast) from a plurality of ports. This is similar in the intermediate node and egress node.

The VLAN filtering control portion 57a notifies the data frame transfer portion 55a of the determined route information, and passes the BPDU 42 to the data frame transfer portion 55a.

The data frame transfer portion 55a determines the transmission port on the basis of the route information notified by the VLAN filtering control portion 57a, and passes the BPDU 42 to the transmission port determining portion 58a of the determined transmission port.

The transmission port determining portion 58a determines whether or not the transmission port is connected to a user network on the basis of the user network connection flag corresponding to the route information (port number 3) in the user network connection determining table (see FIG. 7). It can be seen from FIG. 7 that the port having the port number 3 is not connected to a user network (being connected to the node 3b of the carrier network 3), and hence the transmission port determining portion 58a performs processing to transmit the BPDU 42.

The BPDU 42 is transmitted from the port having the port number 3 of the node 3a, and received in the port having the port number 1 of the node (intermediate node) 3b.

The reception port determining portion 51b of the node 3b determines whether or not the reception port is connected to a user network on the basis of the user network connection flag of the port number 1 in the user network connection determining table (see FIG. 10). It can be seen from FIG. 10 that the port number 1 is not connected to a user network, and hence the reception port determining portion 51b passes the BPDU 42 to the frame determining portion 53b.

The frame determining portion 53b determines whether or not the received frame is a BPDU on the basis of the destination MAC address in the MAC header. In this embodiment, the original destination MAC address of the BPDU 42 is copied, and then modified to a broadcast address. Hence the frame determining portion 53b determines that the VLAN tag-stacked BPDU 42 is a data frame, and passes the BPDU 42 to the data frame transfer portion 55b. Note that since this determination is performed according to the destination MAC address, processing such as that in the first embodiment to differentiate between VLAN tag-stacked BPDUs and no-VLAN-tag BPDUs according to the presence of a VLAN tag is not performed.

The data frame transfer portion 55b passes the BPDU 42 to the MAC filtering control portion 56b.

The MAC filtering control portion 56b determines transfer-possible ports on the basis of the port transfer flags of the destination MAC address (the destination MAC address at the top of the frame) in the MAC address filtering table (see FIG. 14). The destination MAC address of the BPDU 42 has been modified to a broadcast address, and therefore all of the ports having the port numbers 1 to 3 are transfer-possible ports. Note that the transfer-possible port of the data frame having the destination MAC address 00-E0-00-00-11-02 is the port number 2.

The MAC filtering control portion 56b passes the BPDU 42 to the VLAN filtering control portion 57b.

The VLAN filtering control portion 57b determines the transfer-possible port numbers on the basis of the port transfer flags corresponding to the VLAN-ID=1 in the VLAN filtering table (see FIG. 11). It can be seen from FIG. 11 that the ports having the port numbers 1 and 2 are transfer-possible ports, but since transfer to a reception port is not performed, the port number 1 is excluded, and the port number 2 serves as the route information. As a result of the port number determination performed by the MAC filtering control portion 56b and VLAN filtering control portion 57b, the route information of the BPDU 42 is set as the port number 2. Note that the port number of the data frame is also the port number 2. The VLAN filtering control portion 57b notifies the data frame transfer portion 55b of the determined route information, and passes the BPDU 42 to the data frame transfer portion.

The data frame transfer portion 55b determines the transmission port on the basis of the route information notified by the VLAN filtering control portion 57b, and passes the BPDU 42 to the transmission port determining portion 58b of the determined transmission port.

The transmission port determining portion 58b determines whether or not the transmission port is connected to a user network on the basis of the user network connection flag corresponding to the route information (port number 2) in the user network connection determining table (see FIG. 10). From FIG. 10, it can be seen that the port number 2 is not connected to a user network (being connected to the node 3c of the carrier network 3), and hence the transmission port determining portion 58c performs processing to transmit the BPDU 42.

Here, the VLAN tag-stacked BPDU 42 received in the intermediate node 3b has a broadcast address as the destination MAC address. Therefore, the intermediate node 3b processes the BPDU 42 as a data frame rather than a control frame. Hence the intermediate node 3b is able to transfer the received frame without considering whether or not the received frame is a VLAN tag-stacked BPDU. As a result, a VLAN device having a conventional constitution instead of the constitution shown in FIG. 21 may be used without modification as the intermediate node 3b. Accordingly, in this embodiment, nodes having the constitution shown in FIG. 21 need only be disposed as the ingress node 3a and egress node 3c.

Next, the BPDU 42 transmitted from the port having the port number 2 of the node 3b is received in the port having the port number 1 of the node (egress node) 3c.

The processing from the reception port determining portion 51c to the data frame transfer portion 55c of the node 3c is identical to that performed in the node 3b, and hence description thereof has been omitted.

The data frame transfer portion 55c determines a transmission port on the basis of the route information (port number 2) notified by the VLAN filtering control portion 57c, and passes the BPDU 42 to the transmission port determining portion 58c of the determined transmission port.

The transmission port determining portion 58c determines whether or not the transmission port is connected to a user network on the basis of the user network connection flag corresponding to the route information in the user network connection determining table (see FIG. 12). From FIG. 12, it can be seen that the connection destination of the port having the port number 2 is a user network (the bridge 12b), and hence the transmission port determining portion 58c passes the BPDU 42 to the VLAN tag and MAC deleting portion 59c.

The VLAN tag and MAC deleting portion 59c deletes the MAC header (MAC address and type/length) copied the top of the frame and the VLAN tag. Following deletion, the BPDU is set as the BPDU 43. The BPDU 43 has the data structure shown in FIG. 25A. The VLAN tag and MAC deleting portion 59c transmits the BPDU 43 to the transmission port in accordance with the route information. The transmitted BPDU 43 is received in the bridge 12b.

By stacking a VLAN tag to the BPDU and copying a MAC header comprising a broadcast address to the top of the frame at the ingress node in the manner described above, a user network frame can be transferred transparently without determining the presence of a VLAN tag in a control frame at the intermediate node.

Note that data frames need only be subjected to VLAN tag stacking at the ingress node, and a copy of the MAC header need not be attached to the top of the frame.

Even when the MAC address of the data frame is copied and attached to the top of the frame, the data frame is processed by the node in a similar manner to conventional processing and thus transferred between user networks.

INDUSTRIAL APPLICABILITY

The present invention can be used in a communication network system, particularly in VLAN or VLAN over VLAN technology, and in the nodes of a carrier network to which these technologies are applied.

According to the present invention, a BPDU of a user is passed through a carrier network without being discarded, and hence the user may consider the carrier network as a simple pipe, enabling an STP to be realized by the bridges within the user network with no inconsistencies. As a result, the following effects are obtained.

The formation of loops in a spanning tree can be avoided even in a dual homing configuration using no routers, and hence there is no need to have a maintenance person perform the complicated setting required to avoid loops. Thus a VLAN service can be provided between ends spanning a carrier network.

The carrier network and user networks construct spanning trees independently, and hence modification of and damage to the network configuration do not affect the other networks.

The invention claimed is:

1. A carrier network in a virtual network system in which a plurality of user networks connected to said carrier network is constituted as a single virtual network by allocating an identical virtual network identifier to said plurality of user networks, comprising:
   an ingress communication node connected to at least a first user network of said plurality of user networks to receive a control frame transmitted from said first user network, and to attach a tag including said virtual network identifier, and to transmit said control frame attached with said tag to a transmission destination determined on the basis of said virtual network identifier:
   an egress communication node connected to at least a second user network of said plurality of user networks, to receive said control frame attached with said tag, which is to be transmitted to said second user network, to remove said tag from said control frame attached with said tag, and to transmit said control frame to said second user network; and
   a relay communication node to receive said control frame attached with said tag, transmitted from said ingress communication node, and to transfer said control frame to a transfer destination determined on the basis of said virtual network identifier included in said tag of said received control frame,
   wherein said ingress communication node copies header information of said control frame, modifies a destination address included in said copied header information from a destination address for said control frame to a destination address for broadcasting, and further attaches said copied header information including said modified destination address to said control frame as a new header, and said egress communication node further removes said attached new header from said control frame.

2. The carrier network according to claim 1, wherein said ingress communication node receives a data frame, copies header information of said received data frame, attaches said copied header information to said data frame as a new header, and attaches said tag including said virtual network identifier to said data frame attached with said new header, and said egress communication node receives said data frame, which is to be transmitted to said second user network, removes said new header and said tag attached to said data frame from said data frame, and transmits said data frame to said second user network.

3. The carrier network according to claim 1, wherein said control frame is a BPDU in a spanning tree protocol, and said ingress communication node further receives said BPDU, transmitted from a communication node within said carrier network, and executes processing to construct a spanning tree of said carrier network on the basis of said received BPDU.

4. The carrier network according to claim 3, wherein said egress communication node further receives a BPDU, to which a tag including said virtual identifier is not attached, and executes processing to construct said spanning tree of said carrier network on the basis of said received BPDU.

5. A communication node of a carrier network in a virtual network system in which a plurality of user networks connected to said carrier network is constituted as a single virtual network by allocating an identical virtual network identifier to said plurality of user networks, comprising:

a reception portion connected to at least one of said plurality of user networks, to receive a control frame transmitted from said at least one user network;

a tag attaching portion to attach a tag including said virtual network identifier to said control frame received by said reception portion; and a transmission portion to transmit said control frame attached with said tag by said tag attaching portion, to a transmission destination determined on the basis of said virtual network identifier, wherein said tag attaching portion copies header information of said control frame received by said reception portion, modifies a destination address included in said copied header information from a destination address for said control frame to a destination address for broadcasting, and further attaches said copied header information including said modified destination address to said control frame as a new header.

6. The communication node according to claim 5, wherein said reception portion further receives a data frame transmitted from said at least one user network, said tag attaching portion copies header information of said data frame received by said reception portion, attaches said copied header information to said data frame as a new header, and attaches said tag including said virtual network identifier to said data frame attached with said new header, and said transmission portion further transmits said data frame, attached with said new header information and said tag by said tag attaching portion, to a transmission destination determined on the basis of said virtual network identifier.

7. The communication node according to claim 5, wherein said control frame is a BPDU in a spanning tree protocol, and said reception portion further receives said BPDU transmitted from a communication node within said carrier network, said communication node further comprising a control frame processing portion for executing processing to construct a spanning tree of said carrier network on the basis of said BPDU transmitted from said communication node.

8. A communication node of a carrier network in a virtual network system in which a plurality of user networks connected to said carrier network is constituted as a single virtual network by allocating an identical virtual network identifier to said plurality of user networks, comprising:

a reception portion for receiving a control frame to which a tag including said virtual network identifier is attached;

a tag deleting portion for deleting said tag from said control frame when a transmission destination determined on the basis of said virtual network identifier included in said tag of said control frame received by said reception portion is one of said plurality of user networks; and a transmission portion for transmitting said control frame, from which said tag has been deleted by said tag deleting portion, to one of said plurality of user networks, wherein said reception portion receives said control frame to which, in addition to said tag, a new header in which a destination address included in a copy of original header information of said control frame has been modified to a destination address for broadcasting is attached, and said tag deleting portion further deletes said new header from said control frame in addition to said tag.

9. The communication node according to claim 8, wherein said reception portion further receives a data frame to which a tag including said virtual network identifier is attached, and to which a copy of original header information is attached as a new header, said tag deleting portion further deletes said tag and said copied header from said control frame when a transmission destination determined on the basis of said virtual network identifier included in said tag of said data frame received by said reception portion is one of said plurality of user networks; and said transmission portion transmits said data frame, from which said tag and said new header have been deleted by said tag deleting portion, to one of said plurality of user networks.

10. The communication node according to claim 8, wherein said control frame is a BPDU in a spanning tree protocol, and said reception portion further receives said BPDU transmitted from a communication node within said carrier network, said communication node further comprising a control frame processing portion for executing processing to construct a spanning tree of said carrier network on the basis of said BPDU transmitted from said communication node.

11. A communication node of a carrier network in a virtual network system in which a plurality of user networks connected to said carrier network is constituted as a single virtual network by allocating an identical virtual network identifier to said plurality of user networks, comprising:

a reception portion for receiving a control frame transmitted from another communication node within said carrier network and attached with a tag including said virtual network identifier and a new header in which a destination address included in a copy of original header information has been modified to a destination address for broadcasting, and for receiving a data frame attached with said tag and said new header constituted by a copy of said original header information;

a transmission destination determining portion for determining a transmission destination communication node on the basis of said virtual network identifier included in said tag of said control frame and said data frame received by said reception portion; and a transmission portion for transmitting said control frame and said data frame to said transmission destination communication node determined by said transmission destination determining portion.

12. The communication node according to claim 11, wherein said control frame is a BPDU in a spanning tree protocol, and said reception portion further receives another control frame to which said tag including said virtual network identifier is not attached, and further comprising:

a control frame processing portion for determining whether or not a control frame received by said reception portion is attached with said tag, and for executing processing to construct a spanning tree on the basis of said other control frame when determined as not attached with said tag.

* * * * *